(12) United States Patent
Suzuki et al.

(10) Patent No.: US 8,174,565 B2
(45) Date of Patent: May 8, 2012

(54) THREE-DIMENSIONAL IMAGE DISPLAY SYSTEM

(75) Inventors: Yoshio Suzuki, Kanagawa (JP); Qingyu Lu, Kanagawa (JP); Kyohei Iswamoto, Tokyo (JP); Xueming Yu, Kanagawa (JP)

(73) Assignee: Sony Corporation, Tokyo (JP)

( * ) Notice: Subject to any disclaimer, the term of this patent is extended or adjusted under 35 U.S.C. 154(b) by 1122 days.

(21) Appl. No.: 12/025,960

(22) Filed: Feb. 5, 2008

(65) Prior Publication Data

US 2008/0186308 A1 Aug. 7, 2008

(30) Foreign Application Priority Data

Feb. 6, 2007 (JP) ................................ 2007-026760

(51) Int. Cl.
*H04N 13/04* (2006.01)

(52) U.S. Cl. .......................................... 348/51; 348/42

(58) Field of Classification Search .................... 348/42, 348/51
See application file for complete search history.

(56) References Cited

U.S. PATENT DOCUMENTS

| 4,528,587 | A  | * | 7/1985 | Jones, Jr. ........................ 348/44 |
| 2006/0132432 | A1 | * | 6/2006 | Bell ............................. 345/156 |
| 2006/0139314 | A1 | * | 6/2006 | Bell ............................. 345/156 |
| 2010/0157024 | A1 | * | 6/2010 | Park et al. ....................... 348/51 |

FOREIGN PATENT DOCUMENTS

JP 2004-032273 1/2004

* cited by examiner

*Primary Examiner* — Liangche A Wang
(74) *Attorney, Agent, or Firm* — SNR Denton US LLP

(57) ABSTRACT

Disclosed herein is a three-dimensional image display system, including: a multi-parallax image reproduction apparatus configured to reproduce two-dimensional images, which include a plurality of parallax images within one frame, at a first frame rate; and a three-dimensional display apparatus configured to carry out multi-parallax stereoscopic moving picture display at a second frame rate based on a plurality of parallax images reproduced by the multi-parallax image reproduction apparatus where one frame of stereoscopic moving pictures is formed from a multi-parallax image formed from a predetermined number of parallax images; the multi-parallax image reproduction apparatus reproducing an image wherein control information is included in any of the parallax images for every one frame or every plurality of frames, the three-dimensional image display apparatus carrying out control in accordance with the control information included in the parallax images to carry out the multi-parallax stereoscopic moving picture display.

3 Claims, 25 Drawing Sheets

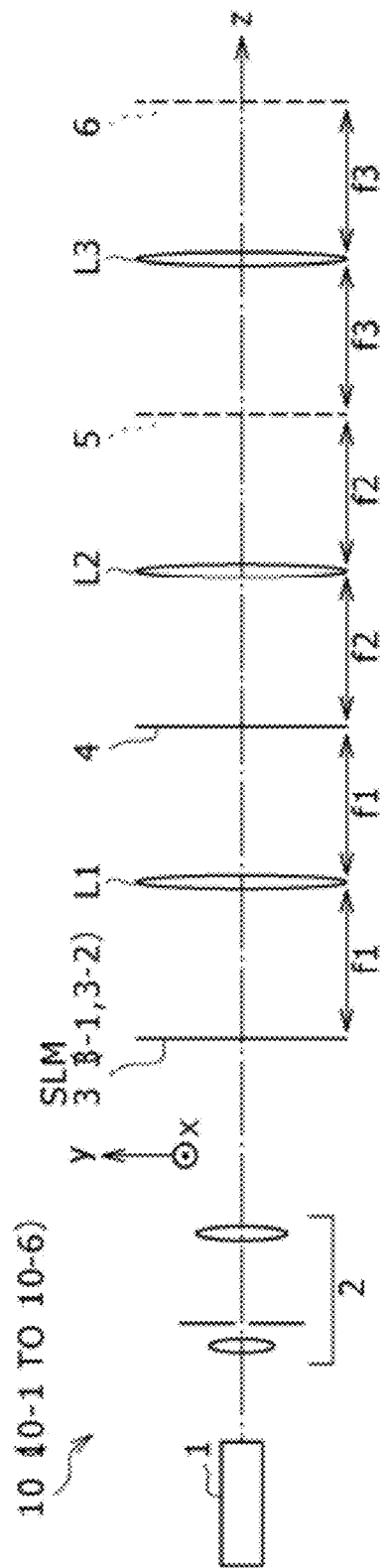
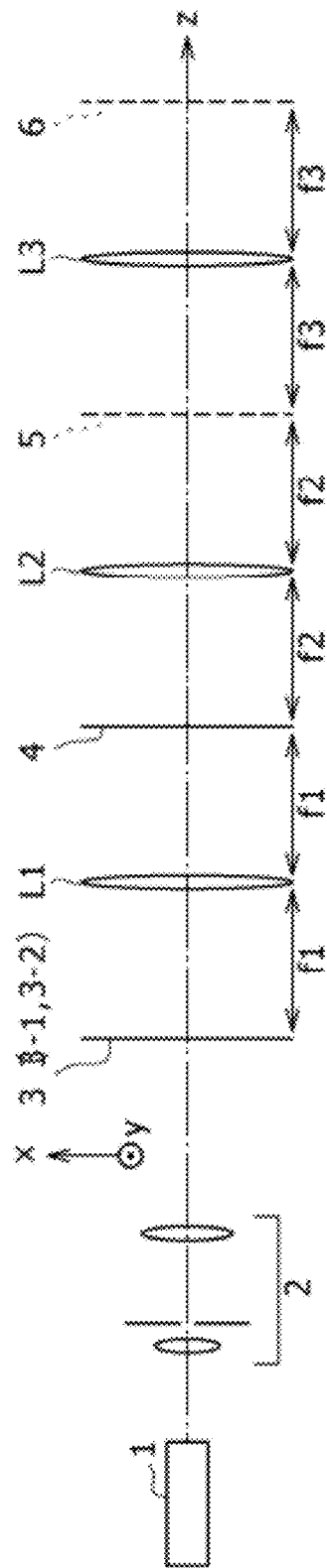

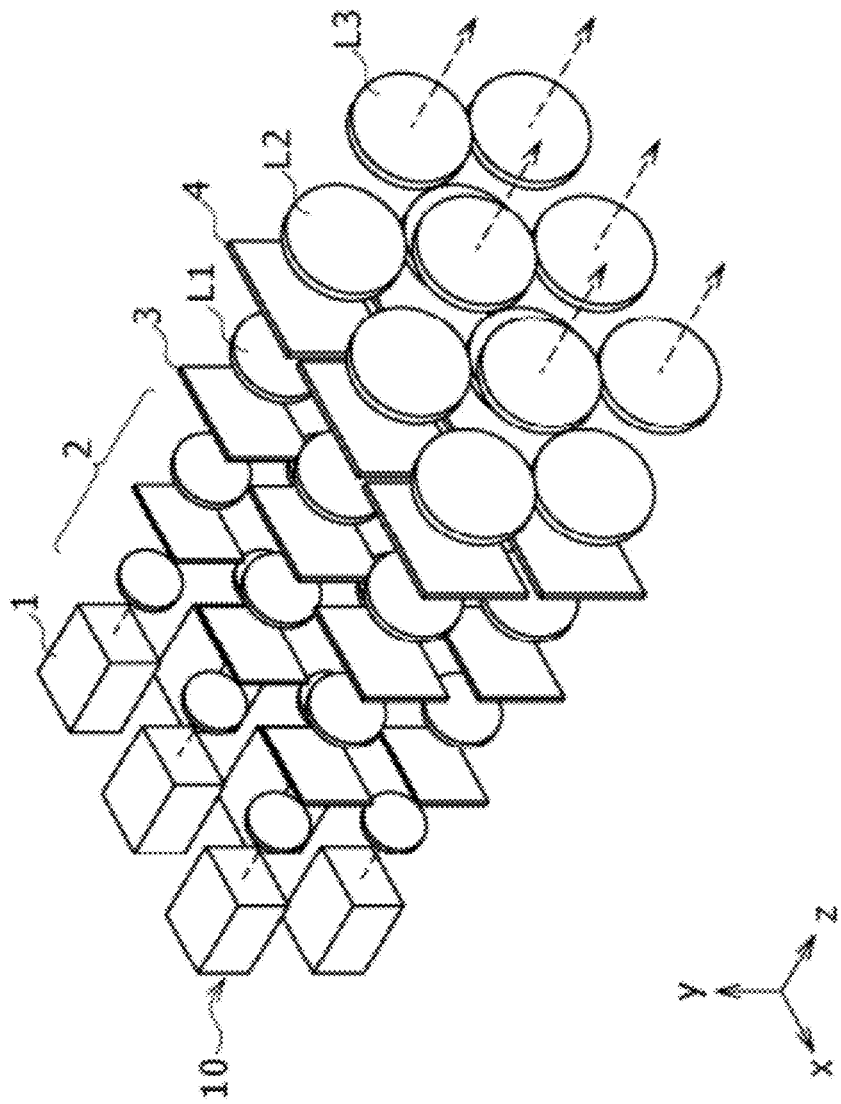

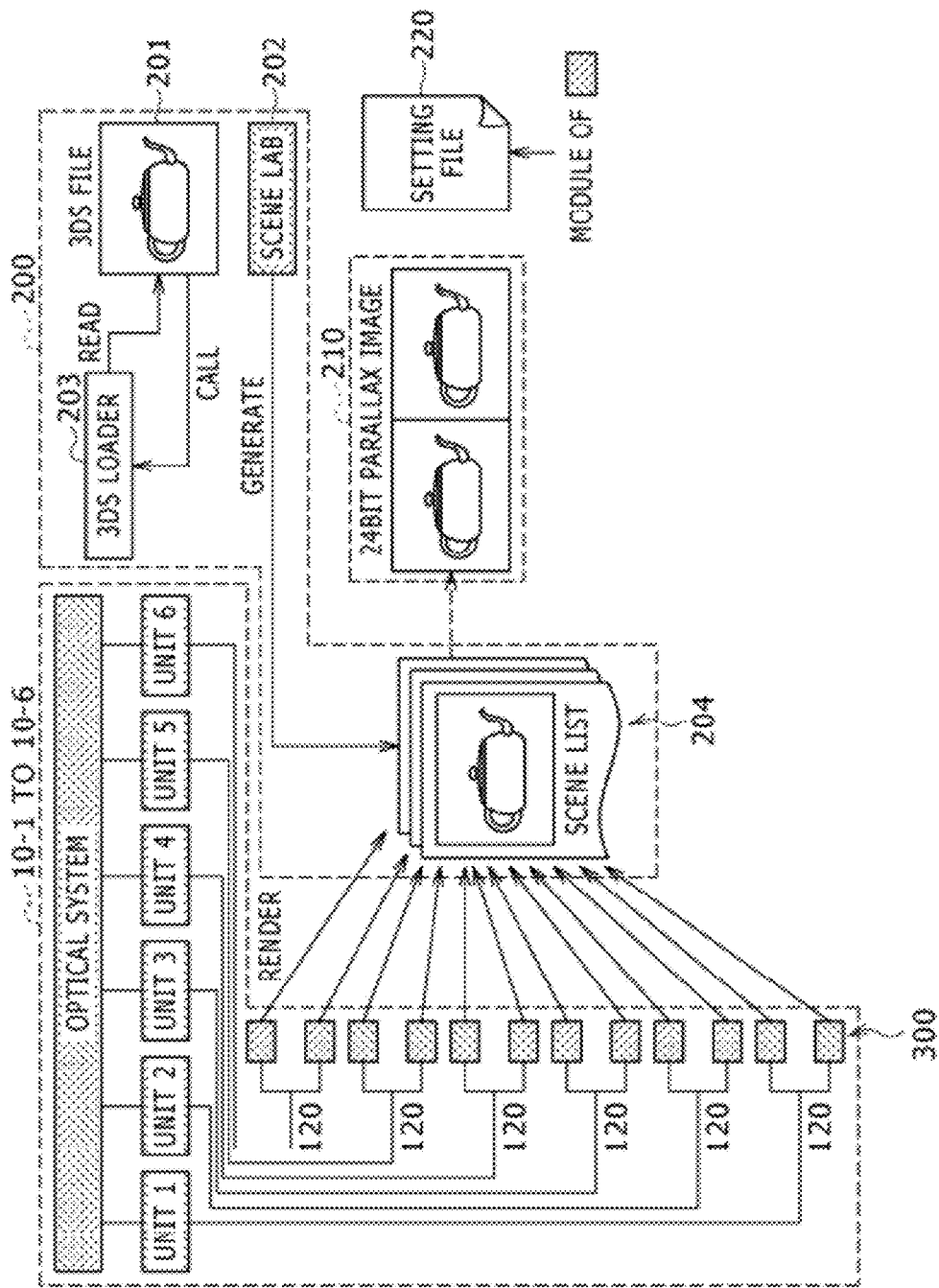

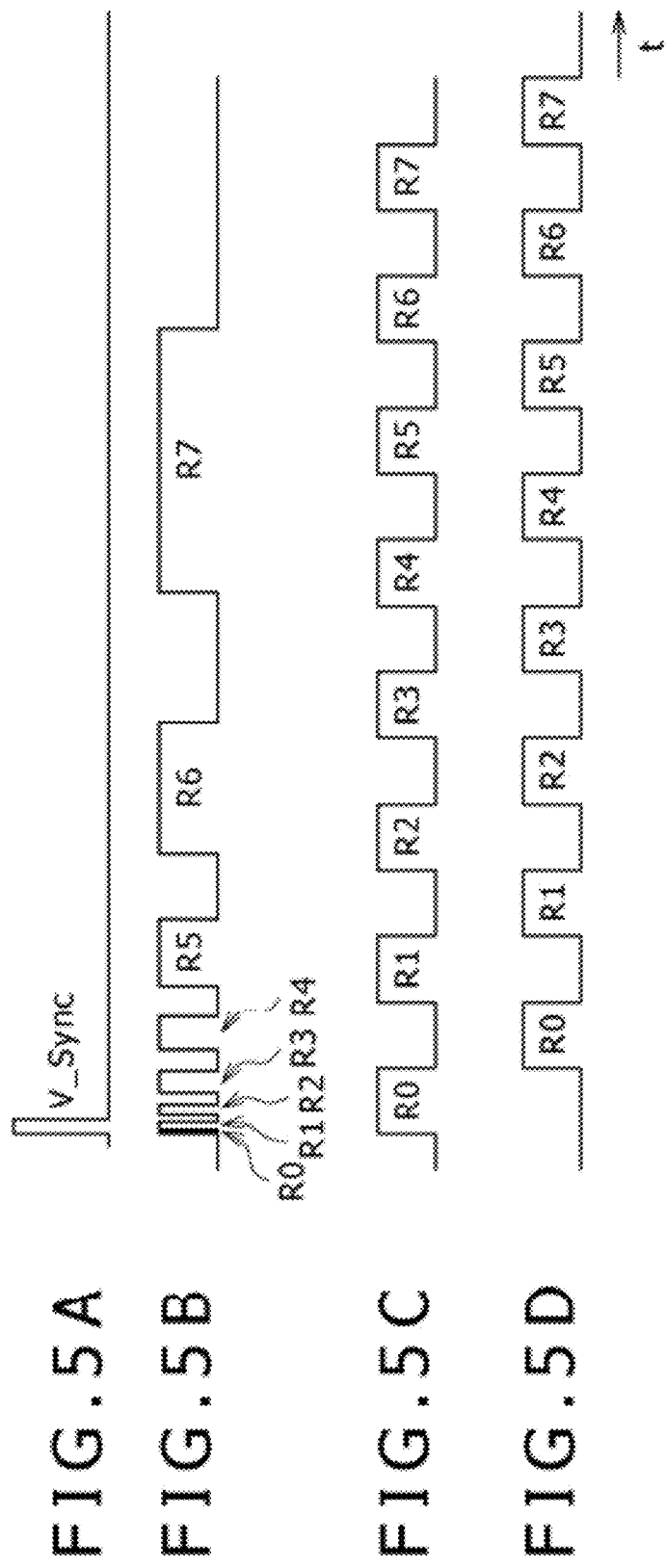

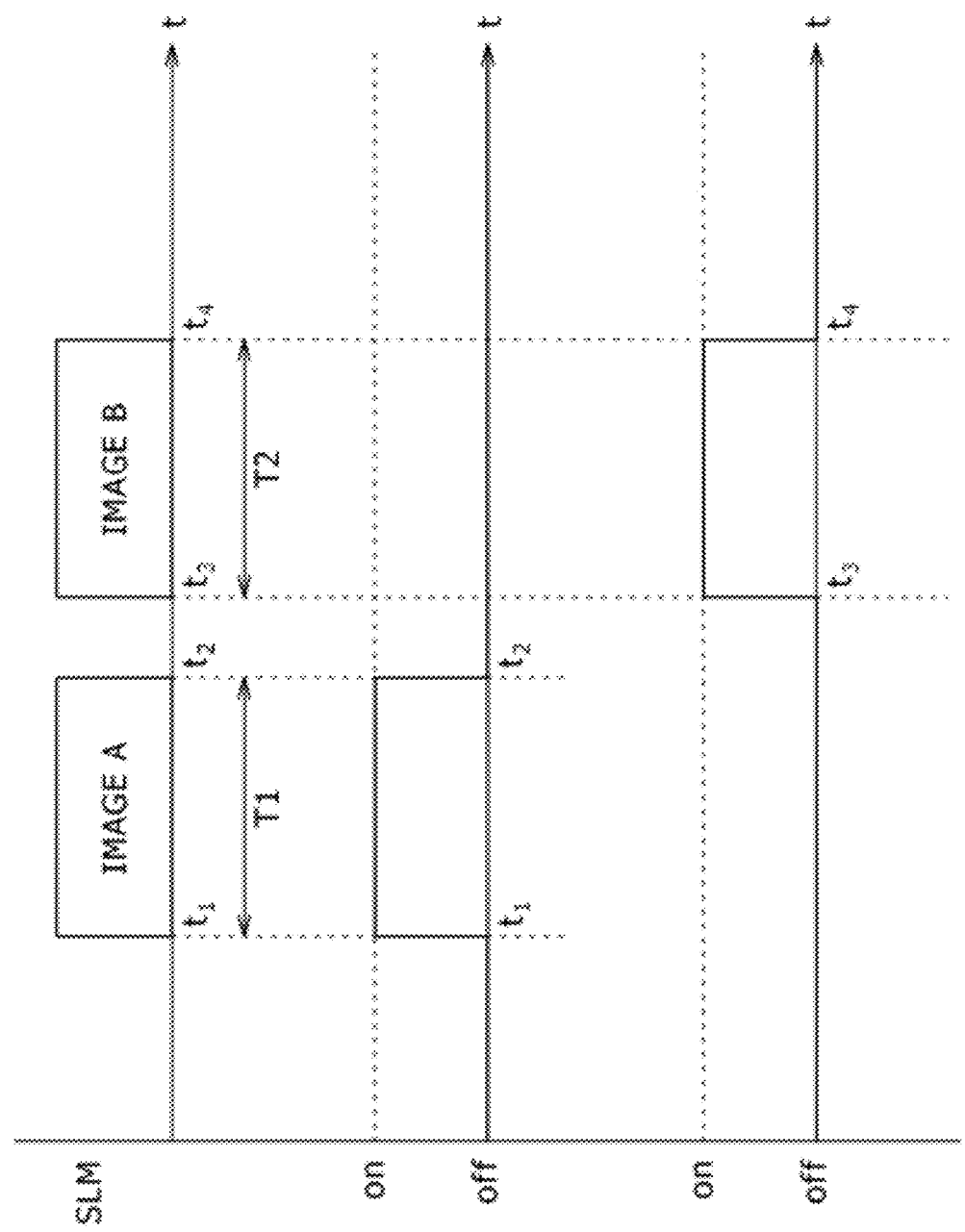

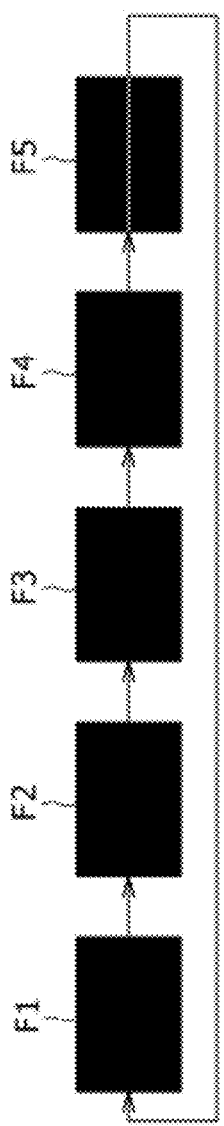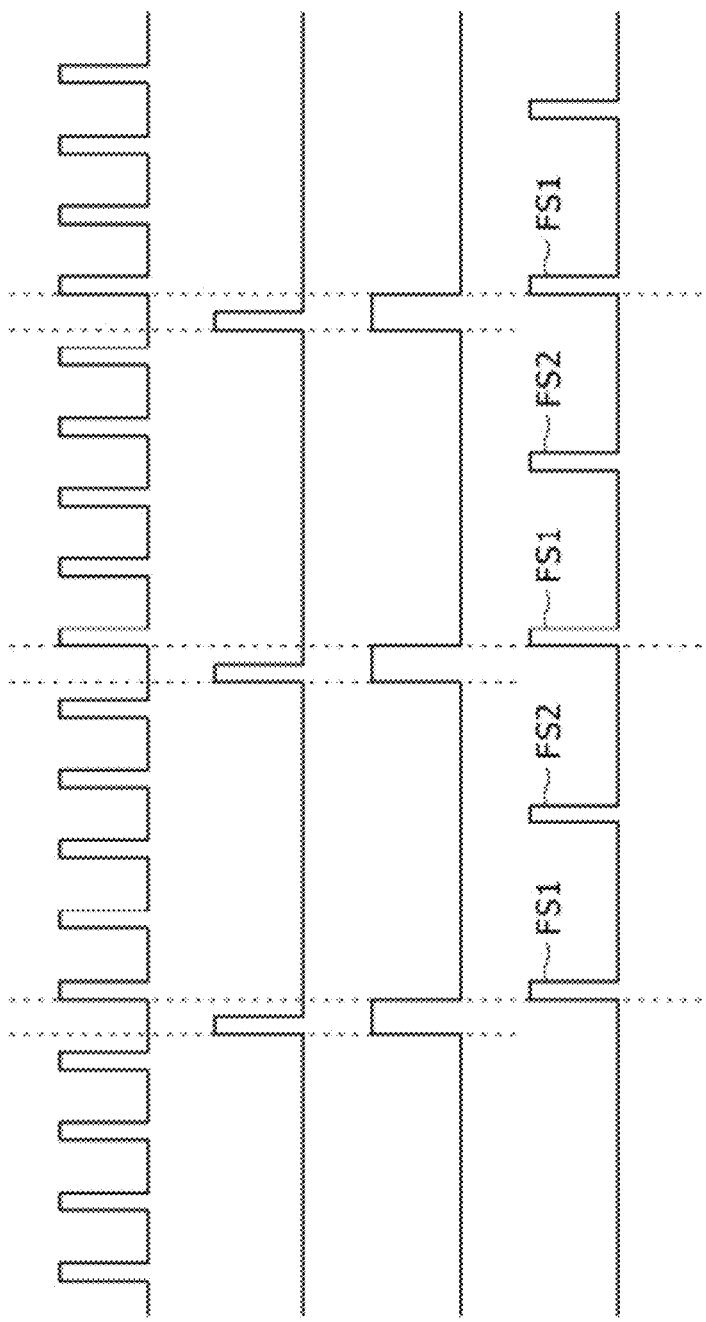
FIG. 28A
FIG. 28B V-Sync SIGNAL
FIG. 28C RS SIGNAL
FIG. 28D RS DETECTION SIGNAL
FIG. 28E CUE SEARCH SIGNAL FE

THREE-DIMENSIONAL IMAGE DISPLAY SYSTEM

CROSS REFERENCES TO RELATED APPLICATIONS

The present invention contains subject matter related to Japanese Patent Application JP 2007-026760 filed in the Japan Patent Office on Feb. 6, 2007, the entire contents of which being incorporated herein by reference.

BACKGROUND OF THE INVENTION

1. Field of the Invention

This invention relates to a three-dimensional image display system for carrying out multi-parallax stereoscopic display based on a plurality of parallax images.

2. Description of the Related Art

In the past, as a technique for generating a stereoscopic image, a two-eye type stereoscopic image technique wherein images different from each other called parallax images are shown to both eyes of an observer so that the observer can feel a stereoscopic effect and a multi-eye type stereoscopic image technique wherein a plurality of sets of parallax images are prepared such that a stereoscopic image from different viewpoints is provided are available, and various techniques relating to such techniques have been and are being developed very much. However, a stereoscopic image by the techniques described above does not physically exist at an intended position as a stereoscopic image, but, for example, each image exists on a two-dimensional display plane and always exists at a fixed position. From this, particularly convergence and adjustment which are physiologic reactions of the ophthalmencephalon are not linked to each other, and visual fatigue caused by this makes a problem.

Meanwhile, in the real world, information of the surface of a physical solid propagates to the eyeballs of the observer through a light wave serving as a medium. As a technique by which a light wave from a physical solid in the real world can be physically reproduced artificially, a holography technique is available. In a stereoscopic image which uses a holography technique, interference fringes generated by interference of light are used, and a diffracted light wave front itself which is generated when light is illuminated on the interference fringes is used as an image information medium. Therefore, an image with which such physiologic reactions of the ophthalmencephalon as convergence and adjustment similar to those when the observer observes a physical solid in the real world occurs and the visual fatigue is reduced can be provided. Further, that the light wave front from the physical solid is reproduced can be considered that the continuity is assured in a direction in which image information is transmitted. From this, the holography technique is regarded also as an image providing technique by which, as the viewpoint of the observer moves, appropriate images from different angles according to the movement can be presented successively and motion parallaxes are provided successively.

However, according to the holography technique, three-dimensional spatial information is recorded as interference fringes in a two-dimensional space, and the amount of spatial frequencies is very great when compared with that of information of a two-dimensional space on a picked up photograph of the same physical solid or the like. It is considered that this arises from the fact that, when information of a three-dimensional space is converted into information of a two-dimensional space, the information is converted into density in the two-dimensional space. Therefore, the spatial resolution necessary for a device which displays interference fringes by CGH (Computer Generated Hologram) is very high, and a very great amount of information is demanded. Therefore, in the existing condition, it is technically difficult to implement a stereoscopic image with a real time hologram.

Therefore, while a stereoscopic image by the holography technique uses, as an information medium, light waves with which information from a physical solid can be regarded as continuous information, a light beam reproduction technique is available wherein such light waves are discretized such that a situation theoretically equivalent to a field formed from light waves in the real world is reproduced with light beams to generate a stereoscopic image. The stereoscopic image technique called light beam reproduction method or integral photography method belongs to the light beam reproduction technique.

In the light beam reproduction technique, a light beam group composed of a large number of light beams propagating in many directions is scattered into a space by optical means in advance. Then, those light beams which are to be propagated from a virtual physical solid surface disposed at an arbitrary position are selected from the light beam group, and modulation of the intensity or phase of the selected light beams is performed to generate an image formed from the light beams in the space. An observer can observe the image as a stereoscopic image. The stereoscopic image by the light beam reproduction method is formed at an arbitrary point from multiple images from a plurality of directions and can be observed in a different manner depending upon the position from which the stereoscopic image is observed similarly as in the case wherein a three-dimensional physical solid in the real world is observed.

As an apparatus for implementing the light beam reproduction described above, an apparatus has been proposed which utilizes a combination of a display device such as a liquid crystal display device or a plasma display device and a microlens array or a pin-hole array. Also an apparatus has been proposed which includes a large number of projectors juxtaposed with each other. FIG. 29 shows an example of a configuration of a three-dimensional display apparatus which implements light beam reproduction using projectors. Referring to FIG. 29, the apparatus shown includes a large number of projector units 101 disposed in a juxtaposed relationship in a vertical direction and a horizontal direction. Light beams are emitted at different angles from each of the projector units 101. With the apparatus, images of multiple visual angles are multiple reproduced at an arbitrary point in a certain sectional plane 102 thereby to implement a stereoscopic image.

In the stereoscopic display by such a light beam reproduction method as described above, it is necessary to reproduce a large number of parallax images simultaneously, and the amount of information increases in proportion to the number of parallaxes. Japanese Patent Laid-Open No. 2004-32273 (hereinafter referred to as Patent Document 1) discloses an image display system which uses the light beam reproduction method to carry out stereoscopic display. The image display system includes a plurality of parallel image display sections each for displaying part of parallax images, and moving picture image information in a compression coded form is sent as parallax images to each of the parallax image display sections so that a large number of parallax images can be reproduced.

SUMMARY OF THE INVENTION

According to the light beam reproduction technique described above, since images are generated from light beams of an intensity with which they act effectively upon focal adjustment and binocular convergence angle adjustment as visual sensation functions, which have been almost impossible with two-eye and multi-eye type stereoscopic images, a stereoscopic image which provides very little fatigue to an observer can be provided. In addition, since light beams are continuously emitted in a plurality of directions from the same element on a virtual physical solid, the variation of the image upon movement of the viewpoint position can be provided continuously.

However, the image generated by the light beam reproduction technique at present lacks in provision of a sense of reality when compared with a physical solid in the real world. It is considered that this arises from the fact that the stereoscopic image by the light beam reproduction technique at present is generated from a much smaller amount of information, that is, from a much smaller amount of light beams, than the amount of information which the observer obtains from the physical solid in the real world. Generally, it is considered that the limit to visual observation of a human being is approximately one minute in angular resolution, and a stereoscopic image by the light beam reproduction method at present is produced from an amount of light beams insufficient to the visual sensation. Accordingly, in order to generate a stereoscopic image which provides such a high sense of reality or such reality as is provided by a physical solid in the real world, it is regarded as a subject at least to generate an image from a large amount of light beams.

In order to implement this, a technique is demanded first which can generate a light beam group in a spatially high density. It is regarded as one of resolutions to raise the display density of a display device such as a liquid crystal display apparatus. On the other hand, in such an apparatus as shown in FIG. 29 wherein a large number of projector units 101 are disposed, it is a possible idea to miniaturize the projector units 101 such that they are juxtaposed in a spatially high density. However, tremendous enhancement of the display density of display devices at present is difficult from the problem of the light utilization efficiency or the diffraction limit. In the case of the apparatus of FIG. 29, since there is a limit to miniaturization of the projector units 101, it is considered difficult to juxtapose the projector units 101 in a spatially high density. In any case, in order to generate a high density light beam group, a plurality of devices are demanded, and increase in size of the entire apparatus may not be avoided.

Further, when a stereoscopic image is reproduced by using the light beam reproduction method, many parallax images have to be projected at the same time. For example, in order to reproduce stereoscopic moving pictures of 100 parallaxes, 100 parallax images are projected at the same time. Accordingly, the information amount to be reproduced is 100 times that of two-dimensional moving pictures. According to the art in the past, a reproduction apparatus such as a computer transfers image data to the individual parallax image reproduction apparatus in advance so that the parallax images are reproduced at the same time by the parallax image reproduction apparatus. If this method is used, then a full color stereoscopic still picture can be displayed. However, if it is tried to reproduce high-definition moving pictures, then the art in the past has the following problem. In particular, since the data amount of moving pictures is greater than that of still pictures, a large amount of data has to be transferred. Besides, the large amount of data has to be transferred at a high speed. According to the art in the past, since several seconds are demanded to transfer parallax images for generating a high definition stereoscopic still picture to individual reproduction apparatus, reproduction of moving pictures is difficult. In the past, in order to reproduce moving pictures, it is necessary to decrease the resolution of parallax images. Or, the frame rate of the moving pictures is set low. Accordingly, in order to use the light beam reproduction method to reproduce high definition moving pictures, it is demanded to develop a technique for reproducing a large amount of parallax images at a high speed. In the image display system of Patent Document 1 mentioned hereinabove, such a countermeasure as to transfer compression coded data as parallax images to increase the speed of reproduction of parallax images is taken. However, a reproduction method which can reproduce a still greater amount of parallax images at a still higher speed is demanded.

As such a reproduction method which can reproduce a still greater amount of parallax images at a still higher speed as described above, for example, it is a possible idea to reproduce images wherein a plurality of parallax images are included within one frame by means of a first image reproduction apparatus, convert a predetermined number of ones of the reproduced parallax images into one frame of multi-parallax stereoscopic moving pictures and carry out multi-parallax stereoscopic moving picture display by means of a second image reproduction apparatus (three-dimensional display apparatus). In this instance, the first image reproduction apparatus reproduces two-dimensional images, and the second image reproduction apparatus reproduces stereoscopic images. Therefore, a difference may possibly appear between the frame rate (first frame rate) of images reproduced by the first image reproduction apparatus and the frame rate (second frame rate) of images reproduced by the second image reproduction apparatus. Generally, when moving pictures are reproduced, the vertical synchronizing pulse of the frames is frequently used to carry out synchronous control. However, where the frame rate differs between the first and second image reproduction apparatus, the vertical synchronizing pulse outputted from the first image reproduction apparatus may not be used for synchronous control in the second image reproduction apparatus. If appropriate synchronism is not kept between the side which provides parallax images, that is, the first image reproduction apparatus, and the size which uses the parallax images, that is, the second image reproduction apparatus, to carry out multi-parallax stereoscopic moving picture display, then the resulting images may not possibly be recognized as stereoscopic moving pictures.

Therefore, it is desirable to provide a three-dimensional image display system wherein synchronous control when multi-parallax stereoscopic moving picture display is carried out can be carried out readily.

According to an embodiment of the present invention, there is provided a three-dimensional image display system including a multi-parallax image reproduction apparatus configured to reproduce two-dimensional images, which include a plurality of parallax images within one frame, at a first frame rate, and a three-dimensional display apparatus configured to carry out multi-parallax stereoscopic moving picture display at a second frame rate based on a plurality of parallax images reproduced by the multi-parallax image reproduction apparatus where one frame of stereoscopic moving pictures is formed from a multi-parallax image formed from a predetermined number of parallax images, the multi-parallax image reproduction apparatus reproducing an image wherein control information is included in any of the parallax images for every one frame or every plurality of frames, the three-dimensional image display apparatus carrying out control in accordance with the control information included in the parallax images to carry out the multi-parallax stereoscopic moving picture display.

In the three-dimensional image display system, an image wherein control information is included in any of the parallax images is reproduced for every one frame or every plurality of frames. The three-dimensional image display apparatus carries out control in accordance with the control information included in the parallax images to carry out the multi-parallax stereoscopic moving picture display. Since the control information is included in the parallax images themselves, synchronous control where multi-parallax stereoscopic moving picture display is carried out can be carried out readily.

For example, the three-dimensional image display system may be configured such that the multi-parallax image reproduction apparatus reproduces, for every predetermined number of frames, an image which includes an identification signal for identifying a frame as the control information, the external control circuit generates, based on the identification signal, a cue search signal for allowing the three-dimensional display apparatus to carry out cue search for a moving picture frame of the multi-parallax stereoscopic moving picture display, the three-dimensional display apparatus carries out cue search for a moving picture frame based on the cue search signal to carry out the multi-parallax stereoscopic moving picture display at the second frame rate different from the first frame rate. In the three-dimensional image display system, synchronous control where multi-parallax stereoscopic moving picture display is carried out can be carried out.

Here, in the three-dimensional image display system, the multi-parallax image reproduction apparatus may have, for example, a function of dividing an image of one frame into a plurality of bit planes and displaying the bit planes time-divisionally. In this instance, preferably the three-dimensional image display system is configured such that the multi-parallax image reproduction apparatus includes a signal generation section configured to output an image signal wherein information of a plurality of parallax images is included in one frame which is divided into a plurality of bit plane groups each of which includes one, two or more bit planes, by allocating information of at least one parallax image to each of the bit plane groups, and an image formation section configured to temporally divide a plurality of parallax images within one frame based on the image signal outputted from the signal generation section and successively reproduce the temporally divided parallax images.

More particularly, the multi-parallax image reproduction apparatus may have, for example, a function of time-divisionally displaying a plurality of gradation bit planes for individual colors in combination for each one frame to successively display color images having gradation representations of a plurality of bits at a predetermined frame rate. In this instance, for example, information of the parallax images is allocated to the gradation bit planes of the individual colors, and an image signal including information of a plurality of parallax images is provided in place of color image signals. Then, the plurality of parallax images are successively reproduced time-divisionally based on the image signals.

In the three-dimensional image display system, a gradation bit plane which is used in a color image display apparatus in the past can be used as a bit plane for reproducing parallax images, and a large amount of parallax images can be reproduced at a high speed.

In summary, with the three-dimensional image display system, since control information is included in a parallax image itself and control is carried out in accordance with the control information included in the parallax image to carry out multi-parallax stereoscopic moving picture display. Therefore, synchronous control when multi-parallax stereoscopic moving picture display is carried out can be carried out readily.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIGS. 2A and 2B are schematic views showing a stereoscopic configuration of the three-dimensional display system of the first embodiment and taken along an yz plane and an xz plane;

FIG. 3 is a perspective view showing an example of a system configuration formed from a combination of a plurality of three-dimensional display apparatus according to the first embodiment;

FIG. 4 is a block diagram showing an example of a system for generating parallax images;

FIGS. 5A to 5D are timing charts illustrating an example of an image signal and wherein FIG. 5A shows a pulse waveform of a vertical synchronizing signal, FIG. 5B is a signal waveform where ordinary 8-bit gradations are implemented, FIG. 5C is a signal waveform of parallax images outputted from a first signal outputting section of the three-dimensional display apparatus and FIG. 5D is a signal waveform of parallax images outputted from a second signal outputting section of the three-dimensional display apparatus;

FIG. 9B shows a pulse waveform of a vertical synchronizing signal in an image signal outputted from each reproduction PC, FIG. 9C shows a signal waveform of a synchronizing pulse (identification signal) included in an image reproduced by each reproduction PC, and FIG. 9D shows a signal waveform of a cue search signal for carrying out cue search for a moving picture frame by the three-dimensional display apparatus;

FIGS. 18A and 18B are views illustrating a distribution of diffraction lights on a spatial filter and wherein FIG. 18A illustrates the distribution on the xy plane and FIG. 18B illustrates a distribution intensity on the x axis;

FIGS. 19A to 19C are diagrammatic views illustrating an image display timing through the spatial light modulator and opening and closing timings of an aperture of the spatial filter and wherein FIG. 19A illustrates an image display timing through the spatial light modulator, FIG. 19B illustrates opening and closing timings of an aperture of the spatial filter, and FIG. 19C illustrates opening and closing timings of another aperture of the spatial filter;

FIGS. 24A to 24C are timing charts illustrating an example of an image signal where gray scale display is carried out and wherein FIG. 24A illustrates a pulse waveform within a period within which illumination light is irradiated, FIG. 24B illustrates a signal waveform where a one-parallax image is displayed in gradations of 1 bit (two gradations), and FIG. 24C illustrates a signal waveform where a one-parallax image is displayed in gradations of two bits (four gradations);

FIGS. 28A to 28E are views illustrating control for establishing synchronism of moving picture frames and wherein FIG. 28A schematically shows controlling images reproduced by a monitoring PC, FIG. 28B shows a pulse waveform of a vertical synchronizing signal in an image signal outputted from the monitoring PC, FIG. 28C shows a signal waveform of a synchronizing pulse (identification signal) included in an image reproduced by the monitoring PC, FIG. 28D shows a signal waveform of a signal for detecting an identification signal, and FIG. 28E is a signal waveform of a cue search signal for carrying out cue search for a moving picture frame by the three-dimensional display apparatus.

DETAILED DESCRIPTION OF THE PREFERRED EMBODIMENTS

In the following, preferred embodiments of the present invention are described in detail with reference to the accompanying drawings.

First Embodiment

First, a three-dimensional image display system according to a first embodiment of the present invention is described.

Figure 1:
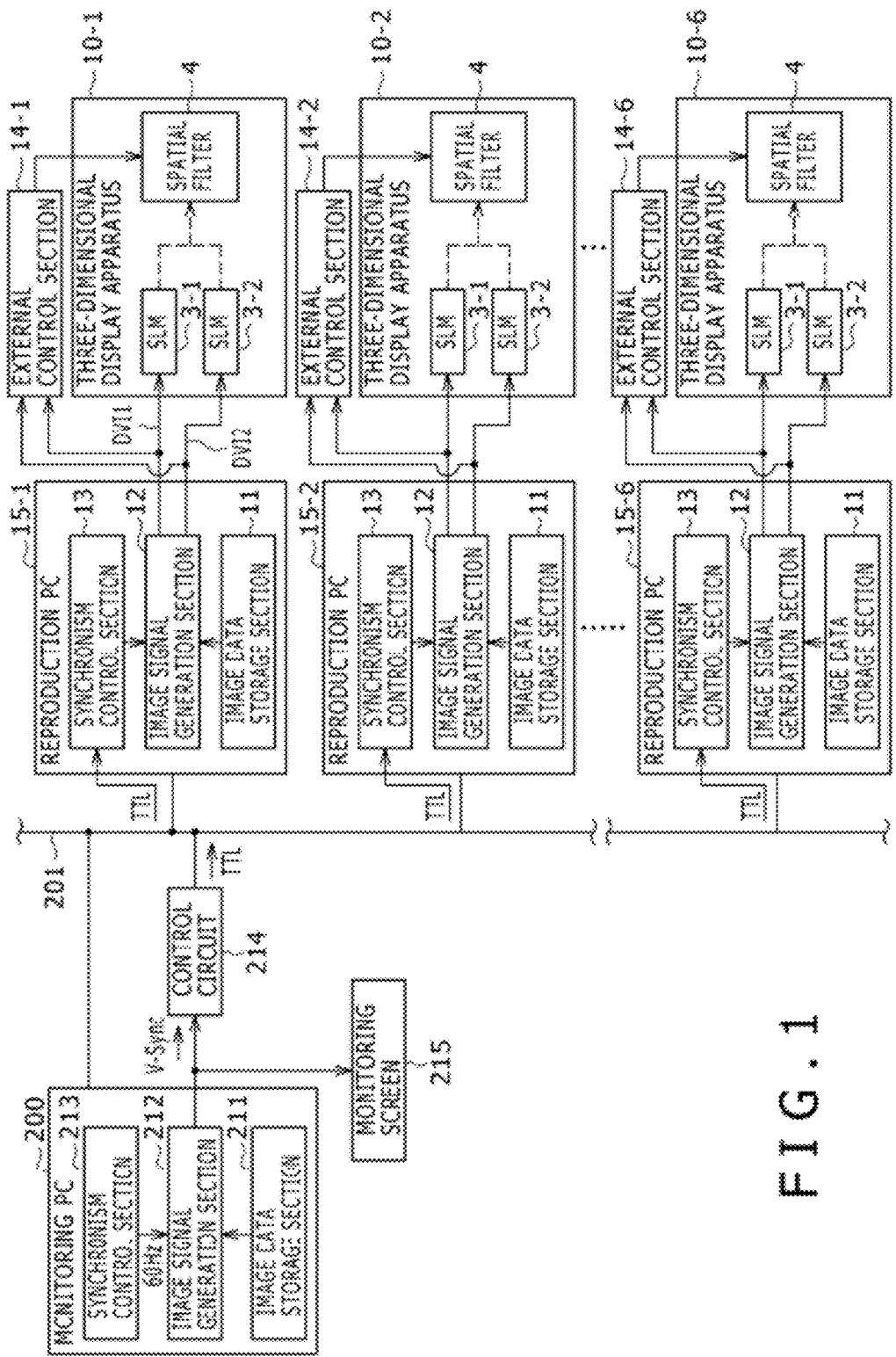
FIG. 1 is a block diagram showing a general configuration of a three-dimensional display system according to a first embodiment of the present invention.

FIG. 1 shows an example of a configuration of the three-dimensional image display system according to the present embodiment. The three-dimensional image display system is configured as a display system of the multiunit type which is formed from a combination of a plurality of three-dimensional display apparatus. FIG. 1 shows, as an example of the three-dimensional image display system, a system which includes six three-dimensional display apparatus 10-1, 10-2, 10-3, 10-4, 10-5 and 10-6 (in the following description, where there is no necessity to distinguish each of the three-dimensional display apparatus 10-1 to 10-6, it is referred to simply as three-dimensional display apparatus 10). Referring to FIG. 1, the three-dimensional image display system further includes reproduction personal computers (PCs) 15-1, 15-2, 15-3, 15-4, 15-5 and 15-6 (in the following description, where there is no necessity to distinguish each of the reproduction PCs 15-1 to 15-6, it is referred to simply as reproduction PC 15) individually provided corresponding to the three-dimensional display apparatus 10-1, 10-2, 10-3, 10-4, 10-5 and 10-6, respectively, for providing parallax images to the three-dimensional display apparatus 10. The three-dimensional image display system further includes external control circuits 14-1, 14-2, 14-3, 14-4, 14-5 and 14-6 (in the following description, where there is no necessity to distinguish each of the external control circuits 14-1 to 14-6, it is referred to simply as external control circuit 14) individually provided corresponding to the three-dimensional display apparatus 10-1, 10-2, 10-3, 10-4, 10-5 and 10-6, respectively, for controlling the timing of multi-parallax stereoscopic display by the three-dimensional display apparatus 10. The three-dimensional image display system further includes a monitoring personal computer (PC) 200 and a monitoring screen 215 for controlling the corresponding reproduction PC 15, and a control circuit 214. Each three-dimensional display apparatus 10 includes a pair of spatial light modulators (SLM) 3 (3-1 and 3-2), and a spatial filter 4. Each reproduction PC 15 includes an image data storage section 11, an image signal generation section 12 and a synchronous control section 13. The monitoring PC 200 includes an image data storage section 211, an image signal generation section 212 and a synchronous control section 213. The reproduction PCs 15, control circuit 214 and monitoring PC 200 are connected to each other, for example, by a local area network (LAN) 201 to form a network.

In the present embodiment, the reproduction PCs 15 and the spatial light modulators 3 correspond to a particular example of a multi parallax image reproduction apparatus. Particularly, each image signal generation section 12 corresponds to a particular example of a signal generation section, and each spatial light modulator 3 corresponds to a particular example of an image formation section. Further, in the present embodiment, the image formation section (spatial light modulator 3) is included in the three-dimensional display apparatus 10.

Figure 29:
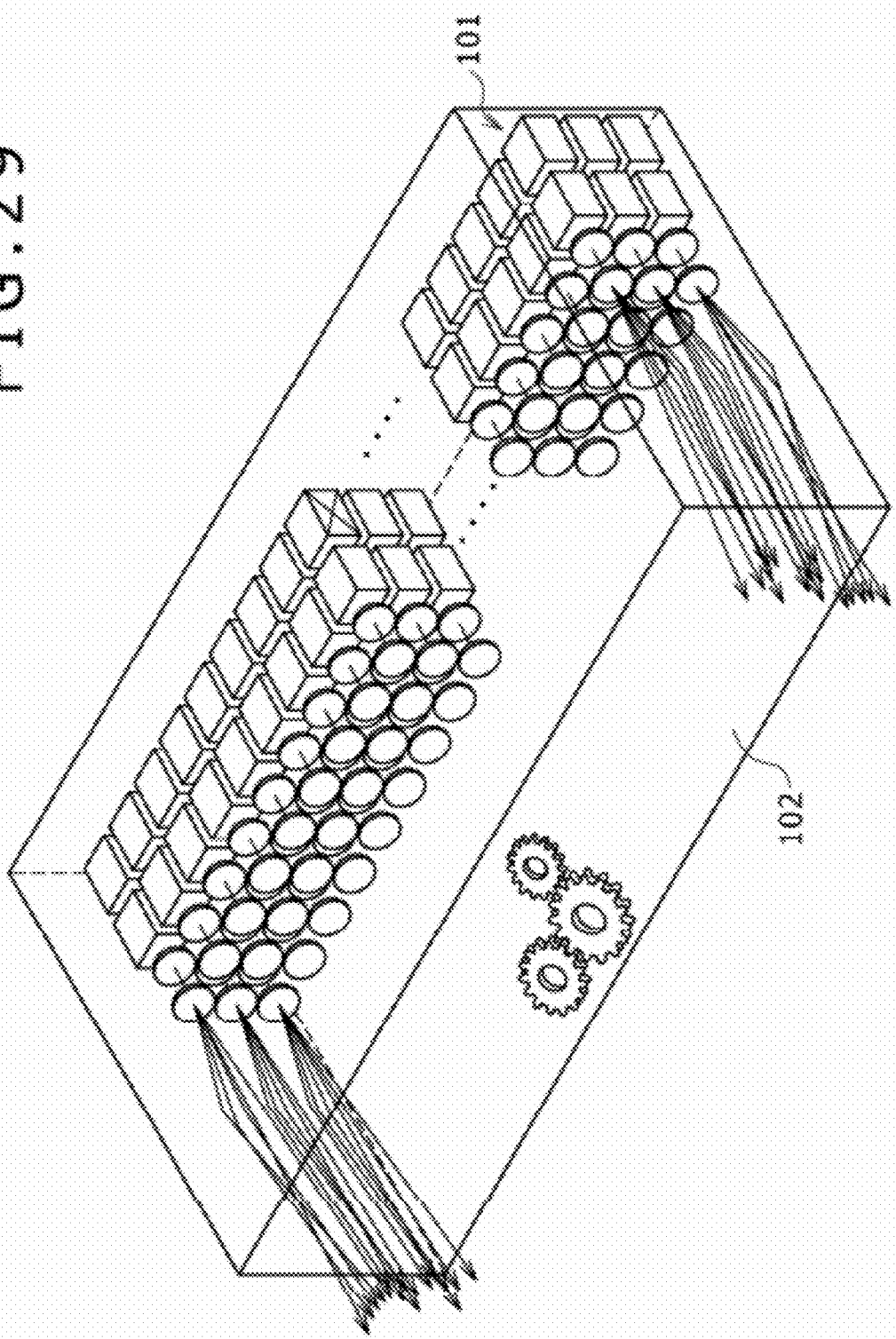
FIG. 29 is a schematic perspective view showing an example of a configuration of a conventional three-dimensional display apparatus.

First, a configuration and action of each three-dimensional display apparatus 10 are described in detail. It is to be noted that the configuration of the three-dimensional display apparatus 10 applied in the three-dimensional image display system is not restricted to that of the following description, but may be such that, for example, such a large number of three-dimensional display apparatus 10 as shown in FIG. 29 are disposed simply.

FIGS. 2A and 2B show an example of a configuration of the three-dimensional display apparatus 10. Here, where the direction of the optical axis is represented by z and the Cartesian coordinates within a plane perpendicular to the z direction are represented by xy, FIG. 2A shows the configuration of the three-dimensional display apparatus 10 on the yz plane while FIG. 2B shows the configuration on the xz plane. In a configuration according to the general light beam reproduction technique, it is necessary to include an apparatus which can provide light beams which can be emitted at various angles in advance in order to emit a plurality of light beams from a virtual origin on the surface of a virtual substance existing at an arbitrary position. For example, in the apparatus shown in FIG. 29, a large number of (for example, M×N) projector units 101 have to be arranged in parallel in a horizontal direction and a vertical direction. On the other hand, in the three-dimensional display apparatus 10 according to the present embodiment, the apparatus itself which includes the components shown in FIGS. 2A and 2B can generate a greater amount of light beams of a spatially higher density than that of existing apparatus. Accordingly, even the apparatus itself shown in FIGS. 2A and 2B in the three-dimensional display apparatus 10 can function as a display apparatus. The single three-dimensional display apparatus 10 has a function equivalent to that of the apparatus shown in FIG. 29 wherein a large number of (M×N) projector units 101 are disposed. Where such a multi unit system as shown in FIG. 1 is applied, a plurality of three-dimensional display apparatus 10 are disposed parallelly in the vertical direction y and the horizontal direction x, for example, as seen in FIG. 3.

Referring back to FIGS. 2A and 2B, the three-dimensional display apparatus 10 includes a light source 1, an illumination optical system 2 for shaping light from the light source 1, and a spatial light modulator 3 for modulating the light from the light source 1 for each pixel to generate a two-dimensional image. The three-dimensional display apparatus 10 further includes a first lens L1 for forming a Fourier transform image for a spatial frequency of the two-dimensional image generated by the spatial light modulator 3, and a spatial filter 4 which allows spatial aperture control for spatially and temporally filtering the Fourier transform image. The three-dimensional display apparatus 10 further includes a second lens L2 for inverse Fourier transforming the Fourier transform image filtered by the spatial filter 4 to form a real image (inverse Fourier transform image) 5 of the two-dimensional image generated by the spatial light modulator 3, and a third lens L3 for forming a conjugate image 6 of the Fourier transform image filtered by the spatial filter 4. In FIGS. 2A and 2B, reference character f1 denotes the focal distance of the first lens L1, f2 the focal distance of the second lens L2, and f3 the focal distance of the third lens L3.

The light source 1 and the illumination optical system 2 are provided in order to generate illumination light for the spatial light modulator 3. The illumination light may be obtained, for example, by shaping a light beam having a high spatial coherence into parallel light. The spatial light modulator 3 is a two-dimensional spatial light modulator having a plurality of pixels arrayed two-dimensionally. The two-dimensional spatial light modulator may be, for example, a liquid crystal display apparatus of the transmission type. The optical axis is a linear line which passes the center of an image display area of the spatial light modulator 3 and extends in a direction perpendicular to an image display plane of the spatial light modulator 3.

The spatial light modulator 3 has P×Q apertures (pixels) arrayed in a two-dimensional matrix, for example, in the x direction and the y direction, and controls the passage of light from the light source 1 for each aperture to produce a two-dimensional image. The spatial light modulator 3 forms a two-dimensional image forming apparatus which generates, based on the two-dimensional image, for each aperture, M diffraction lights including the mth- to m'th-order diffraction lights along the x direction and N diffraction lights including the nth- to n'th-order diffraction lights along the y direction, and consequently generates totaling M×N diffraction lights.

It is to be noted that m and m' are integers and M is a positive integer, and also n and n' are integers and N is a positive integer. For example, P=1,024 (pixels), Q=768 (pixels), m=−5, m'=5, M=m'−m+1=11, n=−5, n'=5, and N=n'−n+1=11. It is to be noted that the numerical values of the parameters are not limited to the specific values. In the present embodiment, the spatial light modulator 3 includes two spatial light modulators 3-1 and 3-2 each having, for example, 1,024×768 pixels so that a two-dimensional image of, for example, totaling 2,048×768 pixels is generated. It is to be noted that preferably each aperture of the spatial light modulator 3 has a rectangular shape on a plane. Where the plane shape of the apertures is a rectangle, Fraunhofer diffraction occurs so that M×N diffraction lights are generated for each aperture (pixel) of the spatial light modulators 3-1 and 3-2. In particular, such apertures periodically modulate the amplitude (intensity) of an incoming light wave to form an amplitude grating from which a light amount distribution conforming to the light transmission factor distribution of the grating is obtained. For example, M×N=121 diffraction lights are generated for each pixel. In other words, since the number of pixels is P×Q on each of the spatial light modulators 3-1 and 3-2, it can be considered that totaling 2×(P×Q×M×N) diffraction lights are generated.

The first lens L1 is disposed such that a generation plane of a two-dimensional image of the spatial light modulator 3 is positioned on a front side focal plane thereof, and forms a Fourier transform image on a rear side focal plane thereof. The first lens L1 condenses a plurality of diffraction lights (M×N diffraction light) of different orders generated for each pixel of the spatial light modulator 3 to form, as a Fourier transform image, diffraction images which are optical images on which all information of the two-dimensional image generated by the spatial light modulator 3 is concentrated for the individual diffraction orders.

Figure 10:
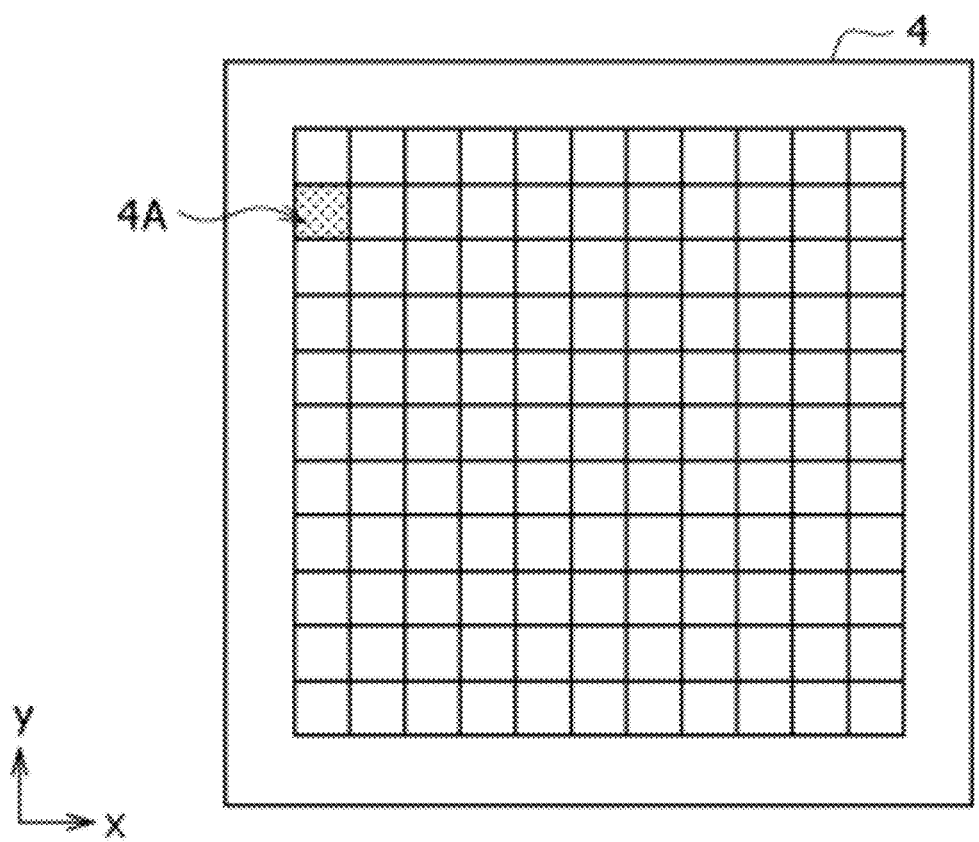
FIG. 10 is a schematic view showing an example of a configuration of a spatial filter.

The spatial filter 4 is disposed on the rear side focal plane of the first lens L1. The spatial filter 4 has a plurality of apertures 4A as seen in FIG. 10. The apertures 4A are provided corresponding to spatial positions of the diffraction order numbers of diffraction lights generated by each pixel of the spatial light modulator 3. The number of the apertures 4A is at least equal to the number corresponding to the number of diffraction orders (for example, M×N=121). The spatial filter 4 selectively controls the apertures 4A thereof to optically open and close the apertures 4A for the individual diffraction order numbers in synchronism with a generation timing of the two-dimensional image by the spatial light modulator 3 to spatially and temporally filter the Fourier transform image. The spatial filter 4 may have any form only if it can control an aperture 4A at an arbitrarily position to optically open and close, and is formed from a liquid crystal display apparatus of the transmission type or the reflection type which uses, for example, ferroelectric liquid crystal. Or, a two-dimensional MEMS (Micro Electro Mechanical System) may be used.

Figure 11:
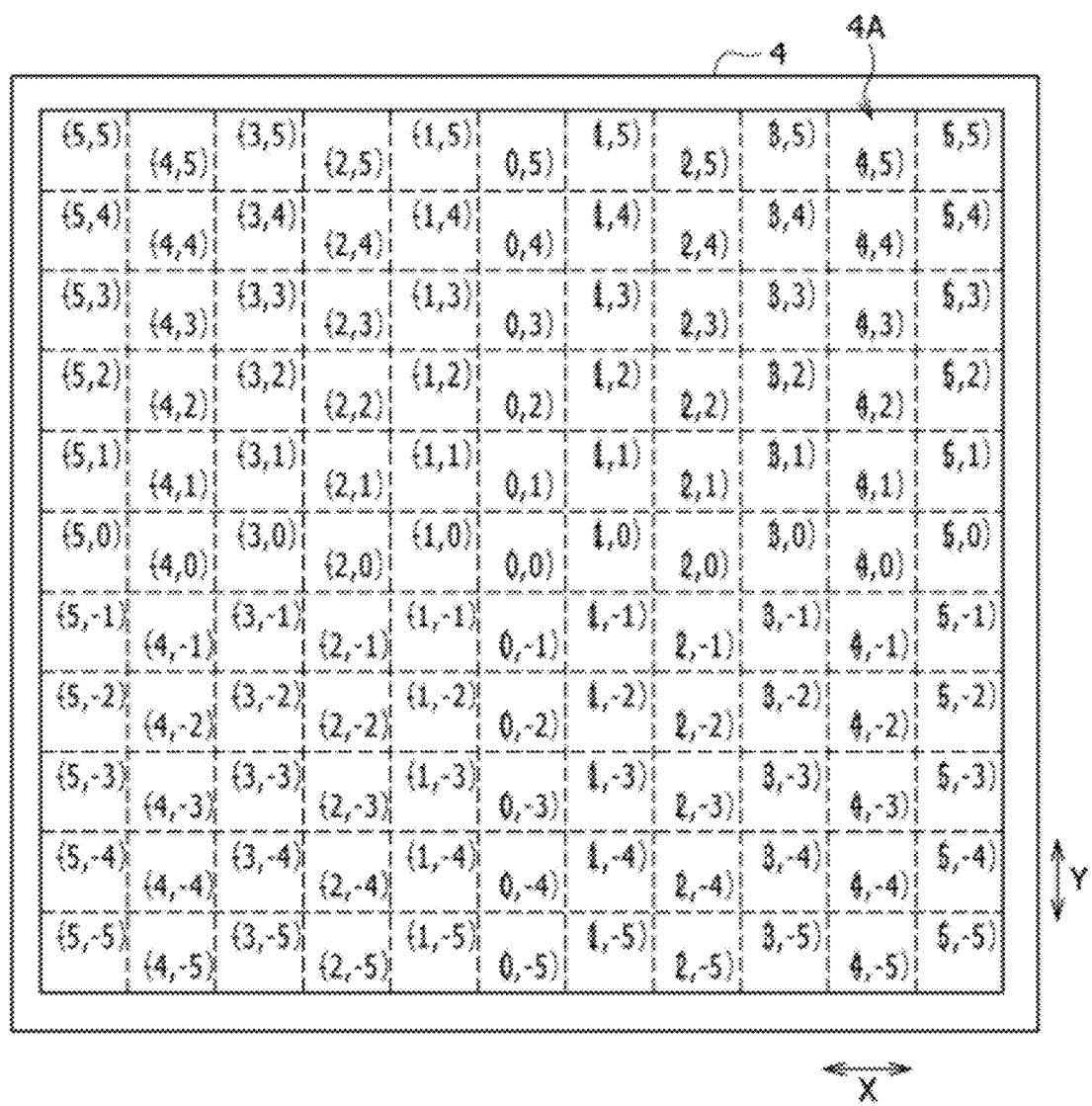
FIG. 11 is a schematic view illustrating an example of a corresponding relationship between apertures of a spatial filter and the order numbers of diffraction lights.

FIG. 11 shows an example of a corresponding relationship between the apertures 4A of the spatial filter 4 and diffraction order numbers of diffraction lights generated by each pixel of the spatial light modulator 3. In the spatial filter 4 shown in FIG. 11, the numerical value pair (m, n) represents the number of the aperture 4A and besides indicates a diffraction order number. For example, into the (3, 2)th aperture 4A, a Fourier transform image having the diffraction order number of m=3 and n=2 enters.

Referring back to FIGS. 2A and 2B, the second lens L2 is disposed so as to have an optical axis same as that of the first lens L1. Further, the second lens L2 is disposed such that the spatial filter 4 is positioned on the front side focal plane thereof, and forms, on the rear side focal plane thereof, a real image 5 of the two-dimensional image generated by the spatial light modulator 3. The magnification of the real image 5 obtained by the second lens L2 with respect to the spatial light modulator 3 can be varied by arbitrarily selecting the focal distance f2 of the second lens L2.

The third lens L3 is disposed so as to have an optical axis same as that of the first lens L1 and the second lens L2. Further, the third lens L3 is disposed such that a conjugate image 6 is formed on the rear side focal plane thereof and the front side focal plane thereof coincides with the rear side focal plane of the second lens L2. Here, since the rear side focal plane of the third lens L3 is a conjugate plane of the spatial filter 4, a number of light beams equal to the number of pixels of the spatial light modulator 3 (=2×P×Q) are outputted from a portion of the spatial filter 4 which corresponds to one aperture. The quantity of light beams to be finally generated and outputted can be defined by a quantity obtained by multiplying the number of light beams equal to the number of pixels by the number of diffraction orders (M×N) having passed through the optical system. It can be considered that, on the rear side focal plane of the third lens L3, light beam groups are regularly disposed two-dimensionally. This is generally equivalent to a state wherein a number of projector units 101 shown in FIG. 29 equal to the number of diffraction orders (particularly M×N) are disposed on the rear side focal plane of the third lens L3.

Now, action of the three-dimensional display apparatus 10 is described.

In the present three-dimensional display apparatus 10, a Fourier transform image for a spatial frequency of a two-dimensional image generated by the spatial light modulator 3 is spatially and temporally filtered by the spatial filter 4 to form a conjugate image 6 of the filtered Fourier transform image.

Figure 12:
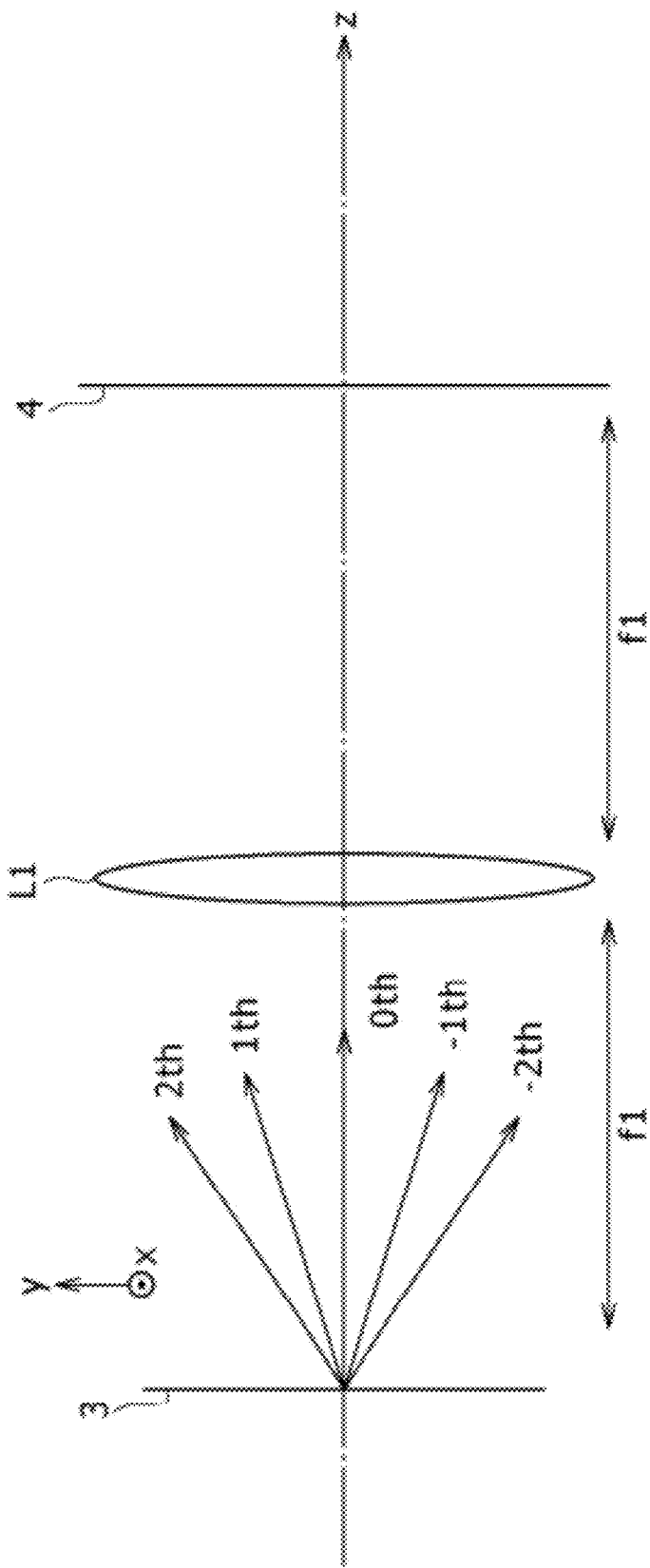
FIG. 12 is a view illustrating action of a spatial light modulator.

In particular, as schematically illustrated in FIG. 12, a plurality of diffraction lights of different order numbers are generated from the spatial light modulator 3. It is to be noted that, while, in FIG. 12, only a 0th-order (0th) light, ±first order (1th) lights and ±second order (2th) lights are illustrated as representative lights, actually higher order diffraction lights are generated and utilized for stereoscopic display. For example, 11 diffraction lights including the −5th to +5th diffraction lights along the x direction and 11 diffraction lights including the −5th to +5th diffraction lights along the y direction, and hence totaling M×N=121 diffraction lights, are generated. Such diffraction lights are generated for each pixel. Accordingly, on the diffraction lights of each order number, all information (information of all pixels) of the two-dimensional image generated by the spatial light modulator 3 is concentrated. A plurality of light beams generated by diffraction from the same pixel of the spatial light modulator 3 all have the same information at the same time.

The first lens L1 condenses a diffraction image, which is an optical image on which all information of the two-dimensional image generated by the spatial light modulator 3, on the spatial filter 4 for each diffraction order number. By utilizing diffraction images by high-order diffraction, a light beam group having a high spatial density is generated.

Here, where the wavelength of the illumination light is represented by λ (mm), the spatial frequency of a structure including an image on the spatial light modulator 3 by ν (1 p/mm), and the focal length of the first lens L1 by f1 (mm), light indicative of the spatial frequency which forms the structure appears at a position of the distance xa (mm) from the optical axis on the rear side focal plane of the first lens L1. Here, the distance xa is represented by $$xa = f1 \lambda \nu \qquad (1)$$

Figure 13:
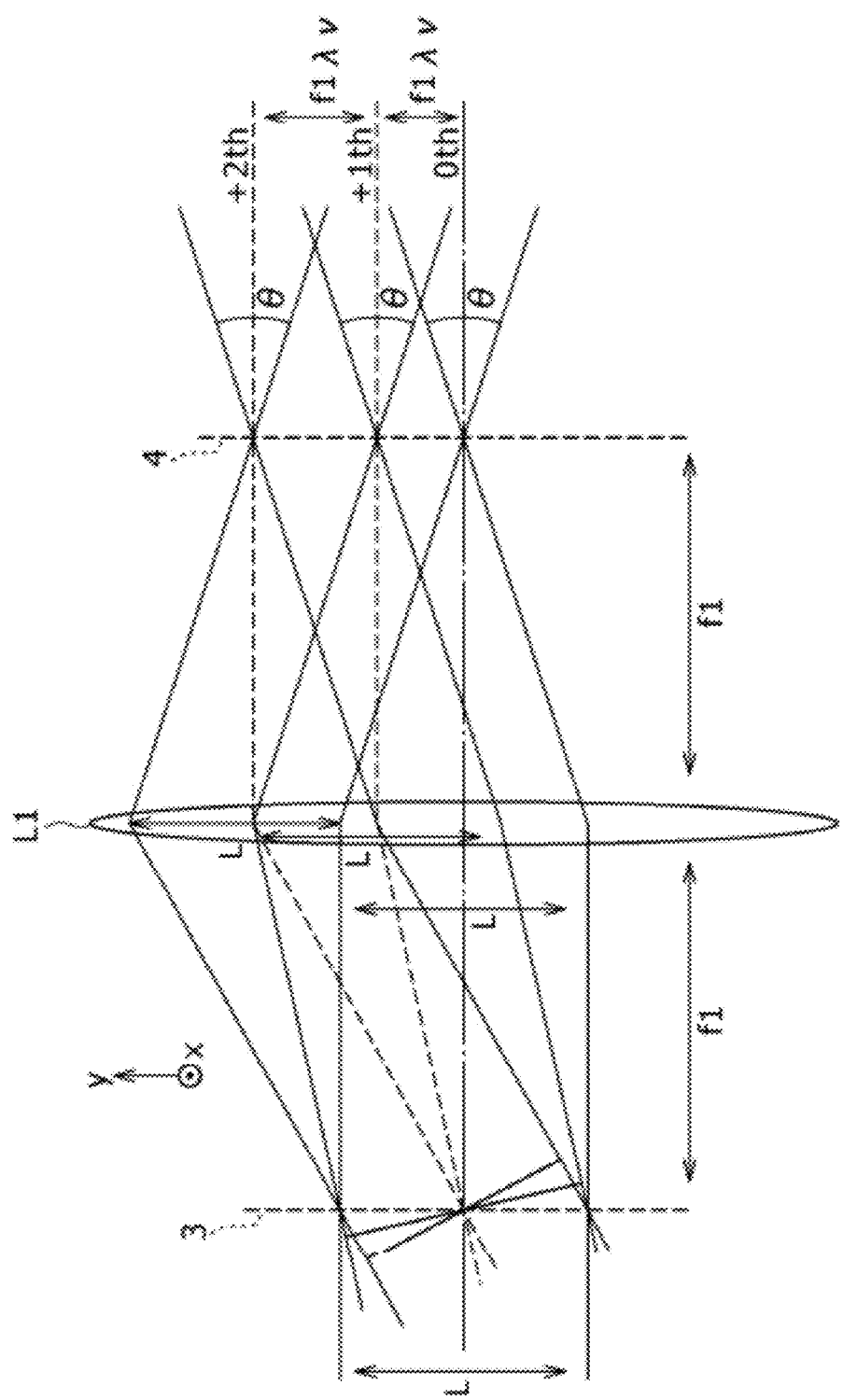
FIG. 13 is a view illustrating action of a first lens.

FIG. 13 schematically illustrates a condensing action of the first lens L1. Referring to FIG. 13, reference character L denotes the magnitude of a two-dimensional image on the spatial light modulator 3. The first lens L1 condenses diffraction lights of the individual orders at different aperture positions on the spatial filter 4. The condensing angle (angle of divergence after emission from the spatial filter 4) θ on the spatial filter 4 is equal among the diffraction lights. From the expression (1) above, it can be recognized that also it is possible to vary the position of the Fourier transform image (image formation position on the spatial filter 4) by arbitrarily selecting the focal distance f1 of the first lens L1. In order to allow the first lens L1 to pass high diffraction order number components therethrough, it is necessary to select the numerical aperture of the lens in response to the diffraction order number components to be utilized, and it is necessary for the numerical aperture of all lenses succeeding the first lens L1 to be higher than the numerical aperture of the first lens L1 irrespective of the focal distance.

Here, since an image displayed on the spatial light modulator 3 is generated by the spatial light modulator 3 which is formed from pixels, the spatial frequency of the image corresponds, at the highest, to a period formed from two successive pixels which compose the spatial light modulator 3.

Figure 14:
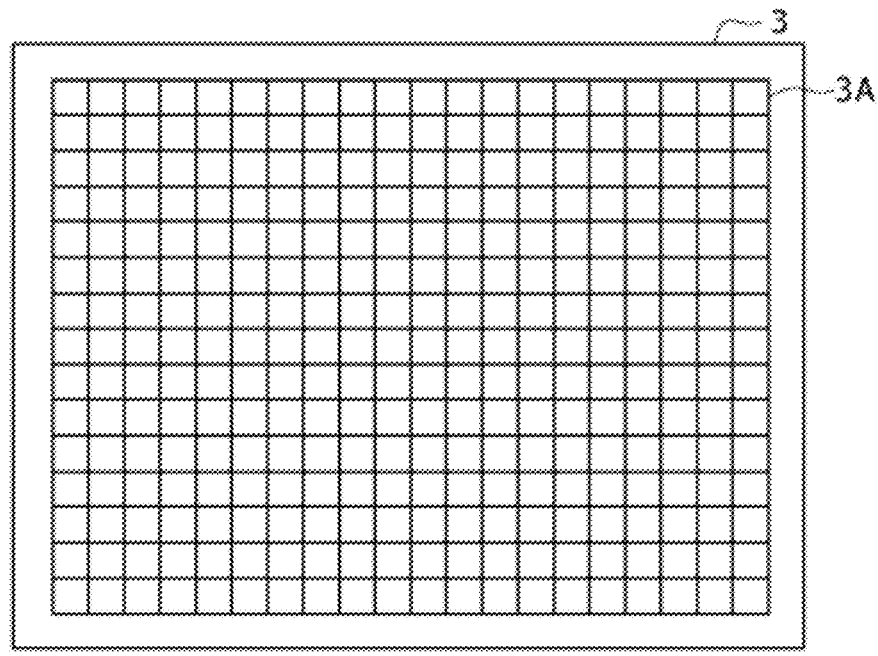
FIG. 14 is a schematic view showing an image of the lowest spatial frequency displayed on the spatial light modulator.
Figure 15:
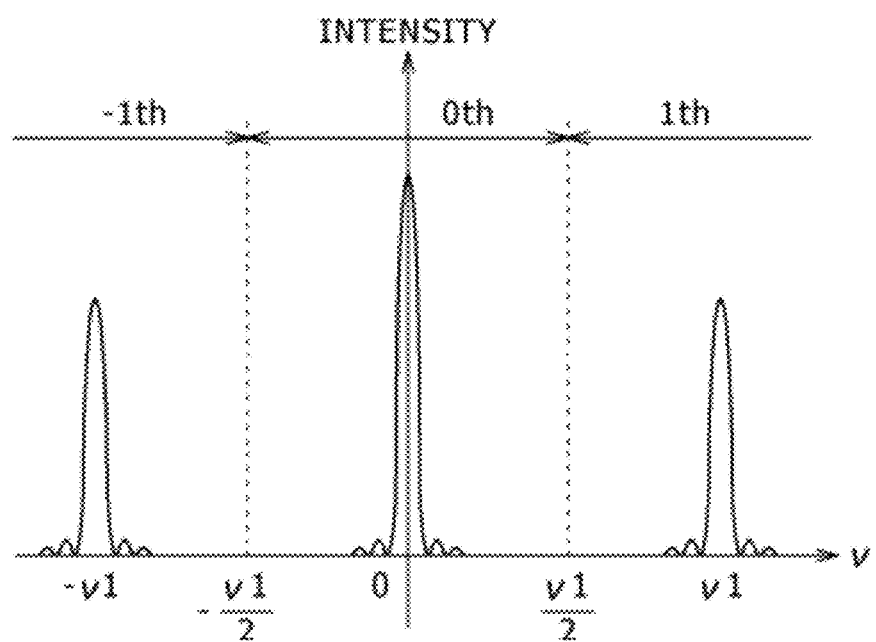
FIG. 15 is a waveform diagram illustrating a frequency characteristic of diffraction components where an image of the lowest spatial frequency is displayed.

FIG. 14 illustrates a state wherein the spatial frequency of an image displayed on the spatial light modulator 3 is lowest. Reference character 3A indicates one pixel. The state wherein the spatial frequency is lowest is a state wherein all pixels display the black or the white, and the diffraction lights in this instance have only information of a plane wave component. It is to be noted that FIG. 14 illustrates a state wherein all pixels display the white. FIG. 15 illustrates a frequency characteristic of the light intensity after Fourier transform by the first lens L1 where the spatial light modulator 3 is in the displaying state of FIG. 14. A peak of the diffraction lights appears at each distance of the frequency ν1.

Figure 16:
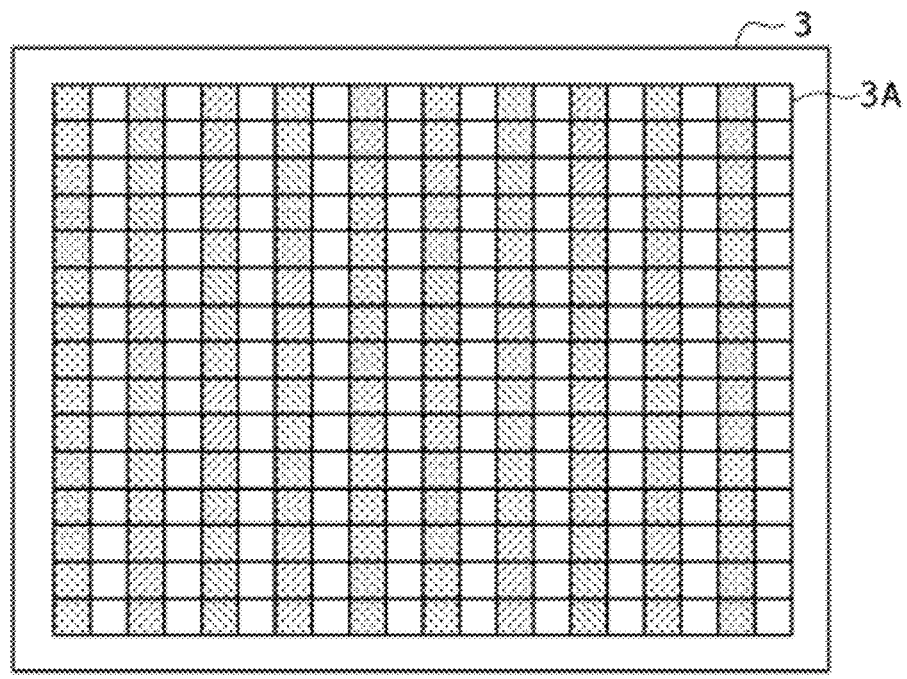
FIG. 16 is a schematic view showing an image of the highest spatial frequency display through the spatial light modulator.
Figure 17:
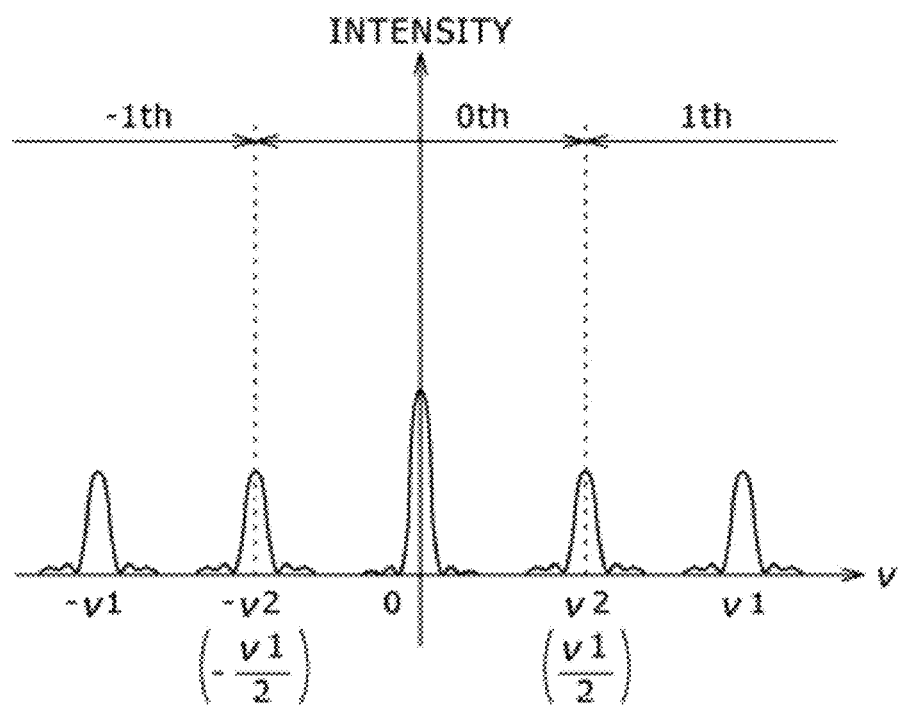
FIG. 17 is a waveform diagram illustrating a frequency characteristic of diffraction components where an image of the highest spatial frequency is displayed.

Meanwhile, FIG. 16 illustrates another state wherein the highest spatial frequency is displayed on the spatial light modulator 3. An image which exhibits the highest spatial frequency is an image wherein the pixels 3A display the black and the white alternately between each two adjacent ones thereof as seen in FIG. 16. FIG. 17 illustrates a frequency characteristic of the light intensity after Fourier transform by the first lens L1 where the spatial light modulator 3 is in the displaying state of FIG. 16. In contrast to the frequency characteristic of the lowest spatial frequency of FIG. 15, a peak of the diffraction light appears at each distance of the frequency ν1/2.

Figure 18A:
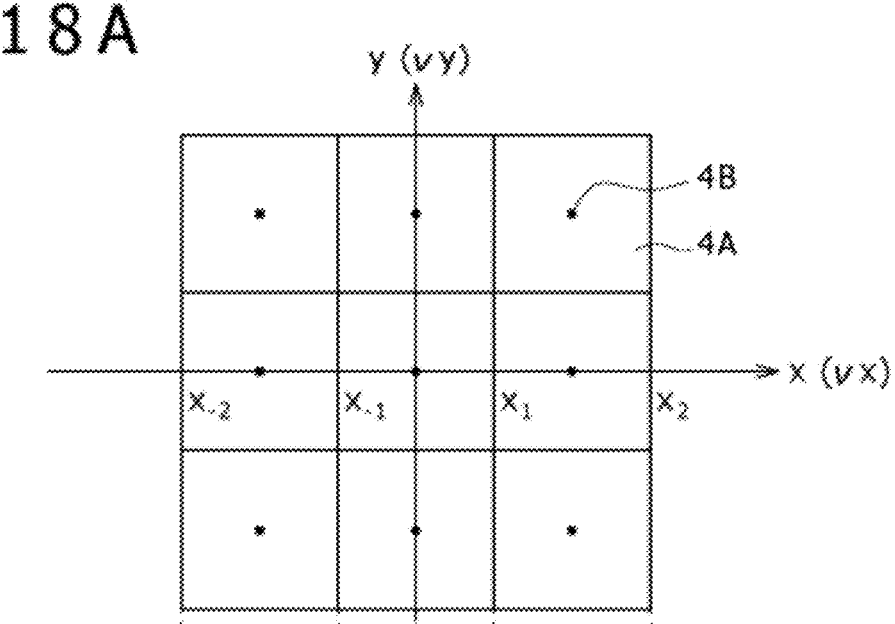
Figure 18B:
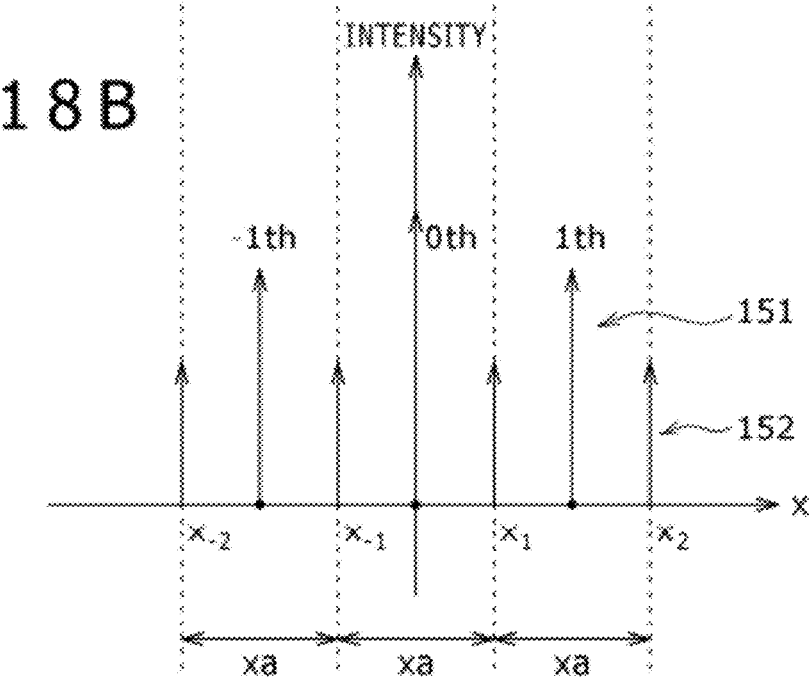

FIGS. 18A and 18B schematically illustrate a distribution of diffraction lights on the spatial filter, and wherein FIG. 18A illustrates the distribution on the xy plane while FIG. 18B illustrates the distribution density on the x axis. In FIG. 18B, the lowest spatial frequency component (plane wave component) and the highest spatial frequency component are displayed simultaneously. A portion denoted by reference numeral 151 denotes a peak which appears with the lowest spatial frequency component, and another portion denoted by reference numeral 152 denotes a peak which appears with the highest spatial frequency component. The aperture shape of the spatial filter 4 relies upon the diffraction pattern of the Fourier transform image, and the spatial filter 4 has apertures 4A centered at the peak position of the plane wave component of the diffraction light and independent of the individual diffraction order number. In other words, the peak position of the plane wave component relies upon the center position 4B of each of the apertures 4A.

In the spatial filter 4, opening and closing control of the apertures 4A is carrier out in accordance with the order number of diffraction in order to apply arbitrary intensity or phase modulation to all light beams. The spatial filter 4 uses, as a component thereof, such apertures 4A with which all positive and negative highest spatial frequencies which can be displayed on the spatial light modulator 3 can be obtained around a center provided by a periodic pattern of the plane wave component on the spatial light modulator 3 which appears on the rear side focal plane of the first lens L1 by diffraction caused by the pixel structure of the spatial light modulator 3.

Since the spatial frequency arising from the pixel structure of the spatial light modulator 3 is equal to twice the highest spatial frequency of an image displayed on the spatial light modulator 3 from the expression (1) given hereinabove, all spatial frequencies of the image appear within a range up to a position at one half of the distance between periodic patterns appearing on the rear side focal plane of the first lens L1 by diffraction caused by the pixel structure. From this, all apertures 4A can be disposed without any spatial interference. Consequently, on the spatial filter 4 having the apertures 4A independent of each other for each plane wave component, information of all spatial frequency components of the image on the spatial light modulator 3 exists in a single aperture portion, and such a situation that any of the spatial frequency components of the image on the spatial light modulator 3 is lost by spatial restriction of the apertures 4A does not occur.

In particular, the apertures 4A have a size of xa according to the expression (1) given hereinabove. As an example, if the wavelength λ of the illumination is 532 nm, the focal distance f1 of the first lens L1 is 50 mm, and the size of one pixel of the spatial light modulator 3 is approximately 13 to 14 μm, then the size xa is approximately 2 mm. This signifies that light beam groups of individual diffraction order numbers can be generated in a high density corresponding to the distance of approximately 2 mm on the spatial filter 4.

In the three-dimensional display apparatus 10, the intensity and the phase of a light beam can be varied by the spatial light modulator 3. However, light beams propagated from the same pixel of the spatial light modulator 3 with regard to all order numbers generated by the diffraction then are under the same modulation. Therefore, by arbitrarily selecting an aperture 4A of the spatial filter 4 to select an arbitrary diffraction order number and modulating an arbitrary pixel, intensity or phase modulation of all of light beams generated by the present apparatus can be carried out. In this manner, the present apparatus can generate a very large number of light beams by high-order diffraction and it can arbitrarily control all light beams by utilization of the spatial filter 4. In the following, the timing of the opening and closing control is described.

The spatial filter 4 performs opening and closing control of the apertures 4A in synchronism with an image output of the spatial light modulator 3 in order to select light beams of an arbitrary diffraction order number. The concept of the opening and closing control is described below with reference to FIGS. 19A to 19C, 20 and 21. FIG. 19A illustrates a timing of image outputting from the spatial light modulator 3. FIG. 19B illustrates opening and closing timings of an aperture 4Aα of the spatial filter 4, and FIG. 19C illustrates opening and closing timings of another aperture 4Aβ.

It is to be noted that, in the present embodiment, the opening and closing control of the apertures 4A of the spatial filter 4 is performed by the external control circuit 14 shown in FIG. 1.

As seen from FIG. 19A, the spatial light modulator 3 displays an image A within a period, for example, from time t1 to time t2 (period T1) and displays another image B within another period from time t3 to time t4 (period T2). In this instance, if it is assumed that the spatial filter 4 operates such that the aperture 4Aα is opened within the period T1 and the aperture 4Aβ is opened within the period T2 as seen in FIGS. 19B and 19C, respectively, then different information can be added to light beams generated as those of different diffraction order numbers from the same pixel of the spatial light modulator 3.

Figure 20:
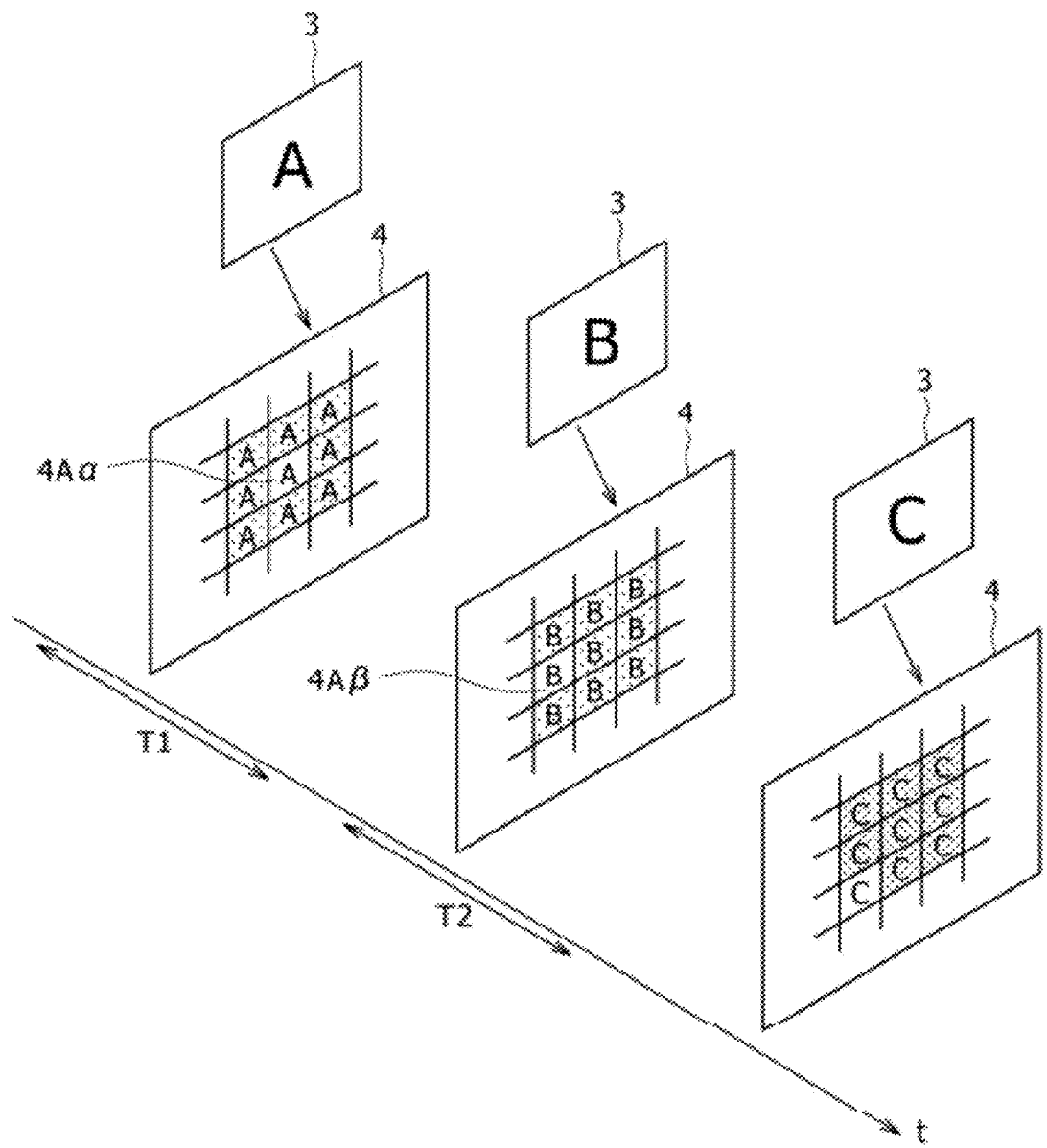
FIG. 20 is a view schematically illustrating a concept of spatial filtering by the spatial filter in a time series.

FIG. 20 schematically illustrates the timing of the image display and the timing of the aperture control. Within the period T1, the image A is displayed on the spatial light modulator 3 and diffraction lights of the individual order numbers are condensed as a Fourier transform image at the corresponding aperture portions of the spatial filter 4. Within the period T1, an operation of opening only a certain one aperture 4Aα is performed. Then, within the period T2, the image B is displayed on the spatial light modulator 3, and diffraction lights for the individual order numbers are condensed as a Fourier transform images at the corresponding aperture portions of the spatial filter 4 similarly. Within the period T2, an operation of opening only one certain aperture 4Aβ different from the aperture 4Aα is performed. Thereafter, the apertures 4A of the spatial filter 4 are successively subjected to opening and closing control in synchronism with image display timings of the spatial light modulator 3.

Figure 21:
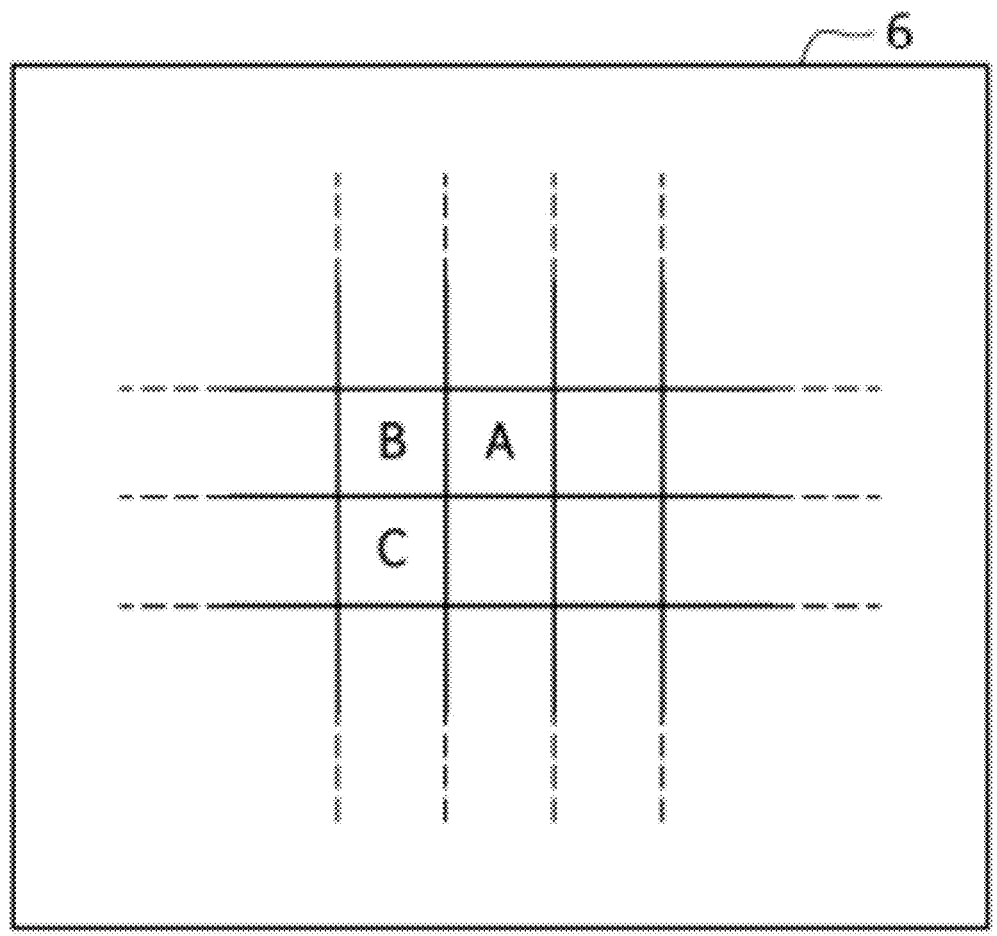
FIG. 21 is a view schematically showing an example of an image obtained as a result of spatial filtering.

FIG. 21 schematically illustrates a stereoscopic image (conjugate image 6) obtained as a final output of the three-dimensional display apparatus 10 when image display and opening and closing control are carried out at such timings as described above. It is to be noted that, although such an image as shown in FIG. 21 is not obtained accurately at the same time, since the changeover period between images is a very short period of time, it is observed by the eyes of a human being that the image is displayed at the same time. For example, within a display period of one frame, image display changeover corresponding to all order numbers is carried out, and opening and closing control of all of the apertures 4A is performed in a general way. Further, although the images are shown displayed like images on a plane in FIG. 21, actually a stereoscopic image is displayed.

As described above, with the three-dimensional display apparatus 10 according to the present embodiment, since Fourier transform images of spatial frequencies of a two-dimensional image generated by the spatial light modulator 3 are filtered spatially and temporally by the spatial filter 4 and conjugate images 6 of the filtered Fourier transform images are formed, light beam groups can be generated and dispersed in a spatially high density without increasing the size of the entire apparatus. Further, the individual light beams which are components of the light beam groups can be temporally and spatially controlled independently of each other. Consequently, a stereoscopic image by light beams having quality proximate to that of an object in the real world can be obtained.

Further, with the three-dimensional display apparatus 10, since the light beam reproduction technique is utilized, an image which satisfies visual sensation functions such as focal adjustment, convergence and motion parallax can be provided. Further, with the three-dimensional display apparatus 10, since high-order diffraction lights are utilized effectively, when compared with an existing image outputting technique, it is possible to obtain a large amount of controllable light beams from a single image outputting device (spatial light modulator 3). Further, with the three-dimensional display apparatus 10, since filtering is carried out spatially and temporally, as a spatial resolution of a display image, a temporal characteristic of the image outputting device can be obtained as a spatial characteristic. Further, a stereoscopic image can be provided without using a diffusion screen. Furthermore, an image can be provided which is appropriate in whichever direction it is observed. Further, since fine light beam groups proximate to a visual confirmation limit can be provided.

Now, a configuration and action of the components other than the three-dimensional display apparatus 10 are described with reference to FIG. 1. In the three-dimensional image display system, the reproduction PCs 15 and the monitoring PC 200 may be formed each from a known personal computer or from a work station.

In each of the reproduction PCs 15, the image data storage section 11 stores images to be reproduced by the corresponding reproduction PC 15, that is, parallax images to be displayed by the three-dimensional display apparatus 10, and is formed, for example, from a hard disk apparatus. The synchronous control section 13 carries out synchronous control of the reproduction PC 15 with the other reproduction PCs 15. The image signal generation section 12 generates an image signal based on the image data stored in the image data storage section 11 and outputs the generated image signal to the spatial light modulators 3 (3-1 and 3-2).

The image signal generation section 12 has output interfaces for two channels, for example, digital visual interfaces (DVI) for two channels, in order to output two signals to the two spatial light modulators 3-1 and 3-2. The image signal generation section 12 is particularly called also video card (video adapter, video board or graphics card) and can be formed from an expansion card which is loaded into a computer to add a screen displaying function to the computer. Here, the video card is usually formed from an LSI chip for drawing an image, a memory (VRAM) for retaining a screen image, terminals for outputting an image signal and so forth. Or, the image signal generation section 12 may be formed from an on-board circuit having a screen displaying function incorporated in a keyboard which composes the computer. It is to be noted that it is necessary for the image signal generation section 12 to include a gen-lock (Generator Lock) function. Here, the gen-lock is also called synchronous coupling and signifies to adjust the frequency and the phase between systems which have built-in synchronizing signal generators independent of each other to fully synchronize the systems with each other or to synchronize the phase and the frequency of an image signal with those of a reference signal between a plurality of image apparatus. In the present embodiment, the synchronous control section 13 has the gen-lock function.

The monitoring screen 215 is used to display a monitoring image thereon and is formed, for example, from a liquid crystal display monitor. In the monitoring PC 200, the image data storage section 211 stores images for monitoring and is formed, for example, from a hard disk apparatus. The synchronous control section 213 outputs a clock signal for synchronous control and outputs a clock signal, for example, of 60 Hz with an accuracy of 0.01 Hz. The image signal generation section 212 generates a predetermined image signal based on the image data stored in the image data storage section 211 and outputs the generated image signal. The image signal generation section 212 is formed from a video card or the like similarly to the image signal generation section 12 of the reproduction PCs 15. The image signal generation section 212 has, for example, a digital visual interface and outputs an image signal for monitoring from the digital visual interface. The image signal generation section 212 has, for example, a VGA interface and outputs a V-Sync signal (vertical synchronizing signal) of a VGA as a synchronizing signal from the VGA interface in synchronism with a clock signal from the synchronous control section 213. The control circuit 214 amplifies the V-Sync signal from the image signal generation section 212 and converts the V-Sync signal into a synchronizing signal of six TTL levels. The control circuit 214 thus outputs the synchronizing signal to the synchronous control section 13 of the reproduction PCs 15. The reproduction PCs 15 are controlled for synchronism based on the synchronizing signal of the TTL level. As a result, in the present system, the entire system is synchronously controlled by the clock signal generated by the synchronous control section 213 of the monitoring PC 200.

Here, an image signal outputted from the image signal generation section 12 of each reproduction PC 15 is described. As described hereinabove, the image signal generation section 12 is formed from a video card or the like which is usually used in a computer. In the following, it is assumed that, in the present embodiment, a video card which can output two color image signals of 24 bits (for each of R, G and B, eight bits) at the same time from the digital visual interfaces thereof is used as an example. Further, it is assumed that a signal for 1,024×768 pixels is outputted per one output, and a signal of totaling 2,048×768 pixels, is outputted. Consequently, an image signal of 24 bits for 1,024×768 pixels is outputted from the first digital visual interface (DVI1) to the first spatial light modulator 3-1, and another image signal of 24 bits for 1,024×768 pixels is outputted from the second digital visual interface (DVI2) to the second spatial light modulator 3-2. In general, an image signal of 24 bits for 2,048×768 pixels is outputted.

FIG. 5A shows a timing chart of the vertical synchronizing signal (V-Sync). FIG. 5B shows a timing chart of gradation bits of an ordinary color image signal. It is to be noted that FIG. 5B shows gradation bits of an R signal as a representative. In a digital image display apparatus (FLC (ferroelectric liquid crystal), DMD or the like) of the binary control type within which the display state of an image can basically take only two states of on and off (light emission (bright)/no-light emission (dark)), basically it may be impossible to carry out continuous gradation representation as in the case of a display apparatus of the analog type represented by a CRT (Cathode Ray Tube). Therefore, in a digital image display apparatus, as a method of carrying out gradation representation in multi stages, for example, a light emission time width modulation method (PWM; Pulse Width Modulation) is used. According to this method, the magnitude of the luminance of a light source is kept fixed while the width of the light emission time is varied in response to the luminance to perform gradation representation. In such a digital image display apparatus as just described, light of a fixed luminance is irradiated continuously from a light source upon the optical modulation element. At this time, the optical modulation element controls the light coming to the image display plane between on (light emission) and off (no-light emission) in a pulse-like fashion as the modulation control of the light. Then, the optical modulation element varies the on/off changeover timing for each pixel to vary the pulse width of the light to carry out gradation representation. The light modulated in this manner is irradiated upon the image display face to display an image with multi-stage gradations. The gradation representation in such a digital image display apparatus as just described utilizes the persistence characteristic of the visual sense system of a human being. In particular, the visual sensation system of a human being recognizes a temporally integrated value of light incoming to the retina within a certain fixed period of time as an intensity of the light. Therefore, by varying the pulse width of light of a short light emission time period at a high rate within a fixed period of time, it is possible to cause the eye of a human being to recognize that the light has a gradation of the luminance.

An image of 256 gradations can be represented, for example, by combining at least eight different images having different luminances within one frame. In particular, in order to represent 256 gradations, the luminance is quantized, for example, into eight gradation bits for each pixel. Then, for example, image data of one frame are represented by a combination of eight image data weighted with the gradation bits. At this time, a set of image data for each gradation bit is usually called "bit plane." A bit plane used in gradation representation is an information plane of the luminance for each gradation bit.

Reference characters R0 to R7 shown in FIG. 5B represent display periods (illumination time periods) of the individual bit planes. The display periods R0 to R7 are different from each other and can be combined to represent gradations of eight bits. For example, the illumination time period of the R7 (whose value is 128) bit plane is twice that of the R6 (whose value is 64) bit plane.

In the present embodiment, based on such a principle as described above, the image signal generation section 12 and the spatial light modulators 3 can display a plurality of gradation bit planes regarding the individual colors for each one frame time-divisionally in combination to implement a function of successively displaying color images whose gradation is represented in a plurality of bits at a predetermined frame rate. Particularly, the image signal generation section 12 has a function of outputting a color image signal which includes information of gradation bits of a plurality of colors within one frame. Further, the spatial light modulators 3 have a function of reproducing a color image based on the color image signal outputted from the image signal generation section 12.

Further, in the present embodiment, the image signal generation section 12 has a function of allocating information of parallax images to gradation bit planes of the individual colors. The image signal generation section 12 further has a function of temporally dividing, if an image signal which includes information of a plurality of parallax images is received in place of a color image signal, the parallax images to successively reproduce the parallax images.

FIG. 5C illustrates a signal waveform of parallax images outputted from the first signal outputting section (digital visual interface DVI1) of the image signal generation section 12, and FIG. 5D illustrates a signal waveform of parallax images outputted from the second signal outputting section (digital visual interface DVI2) In the present system, a binary image (image of gradations of one bit, wire frame image of two values of white and black) is used for the parallax images, and one parallax image is disposed on one bit plane. In particular, such a color image signal which is used as gradation bit planes as seen in FIG. 5B is used as bit planes for parallax image display. For example, as seen in FIG. 5C, the display time of bit planes R0 to R7 for the first spatial light modulator 3-1 is distributed to equal time periods and the bit planes R0 to R7 are individually used as a parallax image signal of a one-bit gradation. Also with regard to the second spatial light modulator 3-2, the bit planes R0 to R7 are individually used as a parallax image signal of a one-bit gradation as seen in FIG. 5D. It is to be noted that, although only signals of the R channel are illustrated in FIGS. 5C and 5D, the description given just above similarly applies also to the G and B channels. Here, In FIG. 5C, a gap exists between adjacent bit planes in display. This gap is a period within which, for example, where an FLC display device is used as the first spatial light modulator 3-1, the electrodes are controlled to an inverted state for establishing a DC balance and no illumination is carried out. In the present embodiment, the display periods of the first spatial light modulator 3-1 and the second spatial light modulator 3-2 are offset from each other to effectively utilize the gaps for the inverted state. In particular, the display periods are adjusted such that a display period of the second spatial light modulator 3-2 exists within an inverted period of the first spatial light modulator 3-1. In other words, simultaneous display by the spatial light modulators 3-1 and 3-2 is achieved within a period of one frame.

Each external control circuit 14 carries out opening and closing control of the apertures 4A of the spatial filter 4 of the corresponding three-dimensional display apparatus 10 based on a signal of parallax images outputted from the corresponding image signal generation section 12. Consequently, in the three-dimensional display apparatus 10, a plurality of parallax images can be projected to different positions in the space in synchronism with the reproduction timings of the parallax images reproduced by the spatial light modulator 3 to carry out multi-parallax stereoscopic display formed from the predetermined number of parallax images.

A particular example of stereoscopic display of moving pictures by the three-dimensional image display system is described below.

Figure 6:
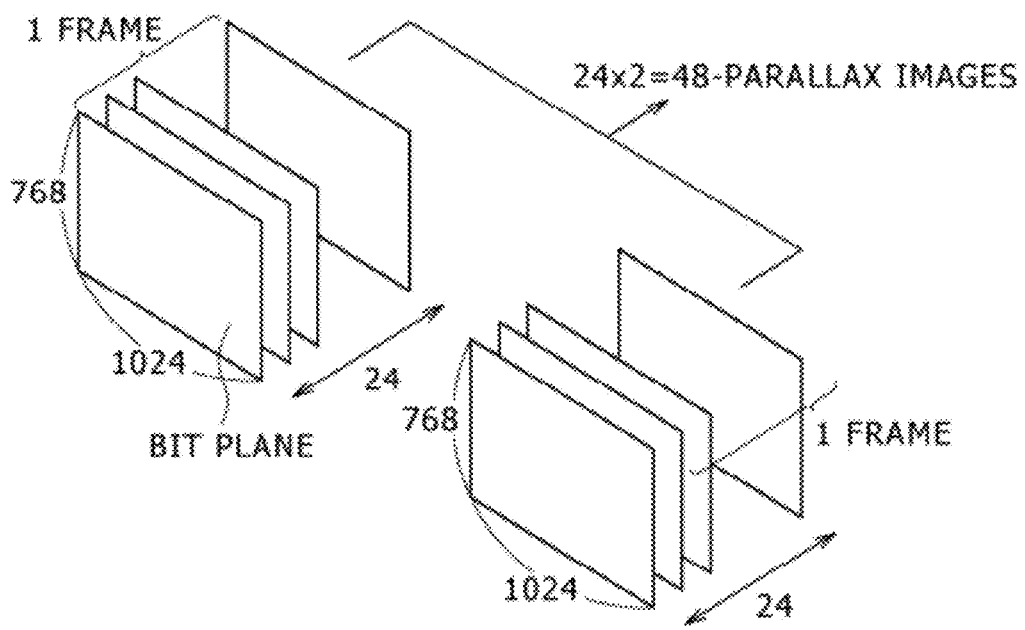
FIG. 6 is a schematic perspective view illustrating a corresponding relationship between frames and bit planes.
Figure 7:
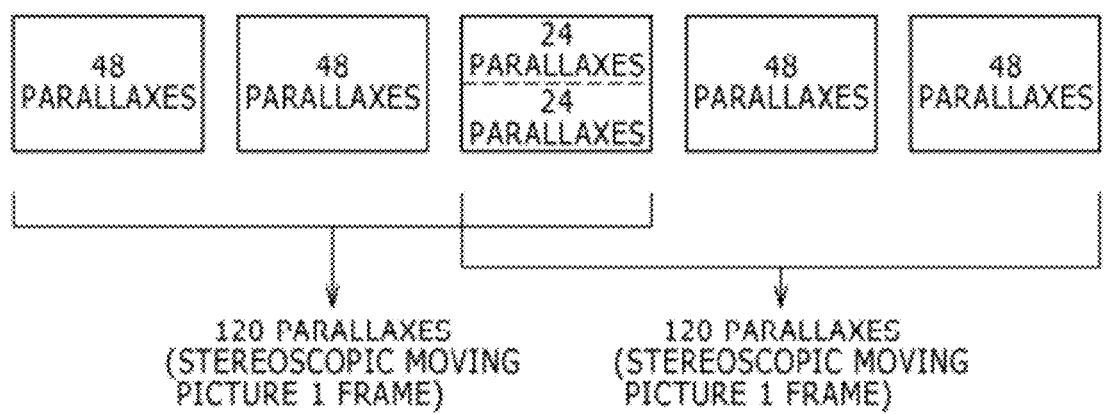
FIG. 7 is a diagrammatic view illustrating a corresponding relationship between parallax images and frames of stereoscopic moving pictures.

As described hereinabove, in the three-dimensional display apparatus 10, the spatial filter 4 has a number of apertures 4A, for example, corresponding to the number of diffraction orders generated by the pixels of the spatial light modulator 3, for example, M×N=121 apertures 4A as seen in FIGS. 10 and 11. Consequently, the spatial filter 4 forms an optical system equivalent, for example, to a parallel arrangement of 121 projectors. In the present embodiment, in each three-dimensional display apparatus 10, for example, 120 projectors (120 apertures 4A of the spatial filter 4) are used for moving picture display according to the light beam reproduction method. In short, one frame as a stereoscopic moving picture is formed from 120 parallaxes.

Where one frame as a stereoscopic moving picture is formed from 120 parallaxes, the spatial light modulators 3 (3-1 and 3-2) display such a frame configuration as, for example, shown in FIG. 6. As seen in FIG. 6, the first spatial light modulator 3-1 successively and time divisionally displays parallax images of 1,024×768 pixels per one frame (1 frame of two-dimensional images). The method for the time division is such as illustrated in FIG. 5C. Totaling 24 gradation bits including eight bits for each of R, G and B are allocated to parallax images of 1,024×768 pixels of one bit to carry out time division display. In other words, the first spatial light modulator 3-1 time division displays 24 parallax images for one frame. Also the second spatial light modulator 3-2 carries out similar time division display. In this instance, the two spatial light modulators 3-1 and 3-2 generally time division display 24×2=48 parallax images. In particular, one reproduction PC 15 outputs an image signal including 48 parallax images within one period of the digital visual interface from the two signal outputting sections (DVI1 and DVI2) of the image signal generation section 12. In this instance, in order to form one frame of moving pictures (120 parallax images), an image signal for 2.5 periods of the digital visual interface should be outputted as seen from FIG. 7. If the output period of the digital visual interface is 60 Hz (first frame rate), then one frame of stereoscopic images (one scene of stereoscopic moving pictures) is reproduced in 24 Hz (second frame rate) (60 Hz/2.5=24 fps). Further, in the three-dimensional image display system shown in FIG. 1, the six reproduction PCs 15 form a network-connected distributed processing system and the six three-dimensional display apparatus 10 display stereoscopic moving pictures in synchronism with each other. Therefore, the entire system can display stereoscopic moving pictures of 120×6=720 parallaxes for one scene in 24 Hz.

Where such display as described above is carried out, two scenes of stereoscopic moving pictures are reproduced by five frames from the reproduction PCs 15 (refer to FIG. 7). Where a plurality of reproduction PCs 15 and three-dimensional display apparatus 10 are used to display stereoscopic moving pictures, it is necessary to keep synchronism of a moving picture frame among the three-dimensional display apparatus 10. In this instance, the image signal generation sections 12 of the reproduction PCs 15 may output identification information of a frame at a rate of one time per five frames such that the external control circuits 14 may establish synchronism of opening and closing control of the apertures 4A of the spatial filter 4 of the three-dimensional display apparatus 10 based on the identification information.

Figure 8:
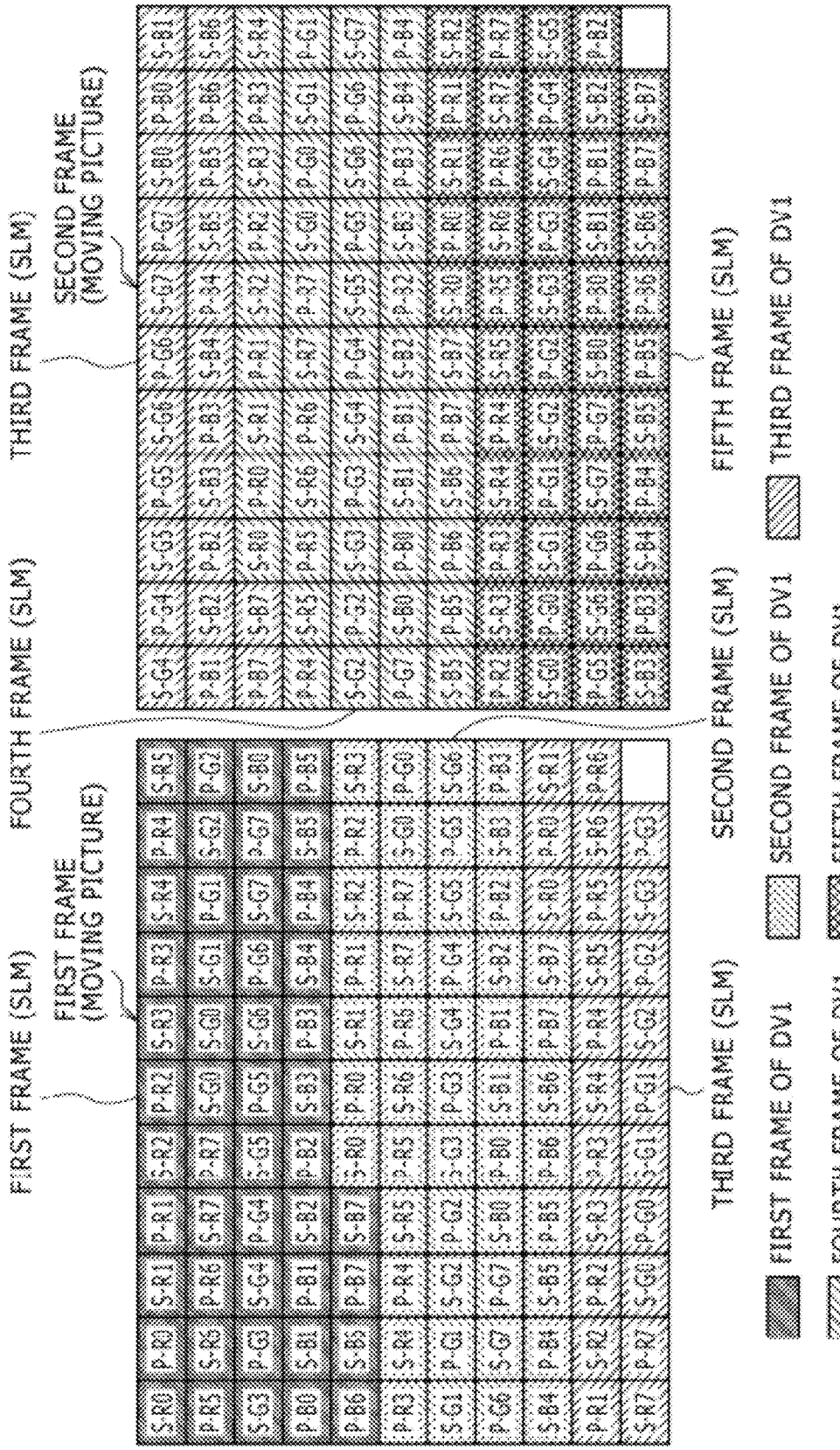
FIG. 8 is a view illustrating an example of arrangement of parallax images on a spatial filter.

FIG. 8 illustrates an example of allocation of bit planes of parallax images to the apertures 4A of the spatial filter 4 of each three-dimensional display apparatus 10 where multi-parallax stereoscopic moving pictures are displayed in such a frame structure as seen in FIGS. 6 and 7. Referring to FIG. 8, reference characters R0 to R7 denote R channels of eight bits outputted from the signal outputting sections (DVI1 and DVI2) of the image signal generation sections 12, and G0 to G7 denote G channels of eight bits and B0 to B7 denote B channels of eight bits. Further, reference character S denotes a channel from the first signal outputting section (DVI1), and P a channel from the second signal outputting section (DVI2). For example, S-R0 indicates a bit plane of the channel of the R0 bit from the first signal outputting section (DVI1). In FIG. 8, the left side block indicates the first frame of stereoscopic moving pictures, and the right side block indicates the second frame of stereoscopic moving pictures. As described hereinabove with reference to FIG. 7, 2.5 frames from the image signal generation section 12 correspond to one frame of stereoscopic moving pictures. Bit planes for 2.5 frames from the image signal generation section 12 are allocated to the first frame of stereoscopic moving pictures, and next bit planes for 2.5 frames are allocated to the second frame of stereoscopic moving pictures.

Here, the S-R0 bit plane allocated to the leftmost uppermost aperture in FIG. 8 is allocated at a rate of once per five frames from the image signal generation section 12. For example, if identification information for the identification of the S-R0 bit plane is outputted from the image signal generation section 12 and is used as a cue search signal for a moving picture frame, then synchronous control of moving picture frames when the three-dimensional display apparatus 10 carry out stereoscopic moving picture display can be carried out. It is to be noted that the synchronous control is preformed by the external control circuit 14 establishing synchronism of opening and closing control of the apertures 4A of the spatial filter 4.

Figure 9:
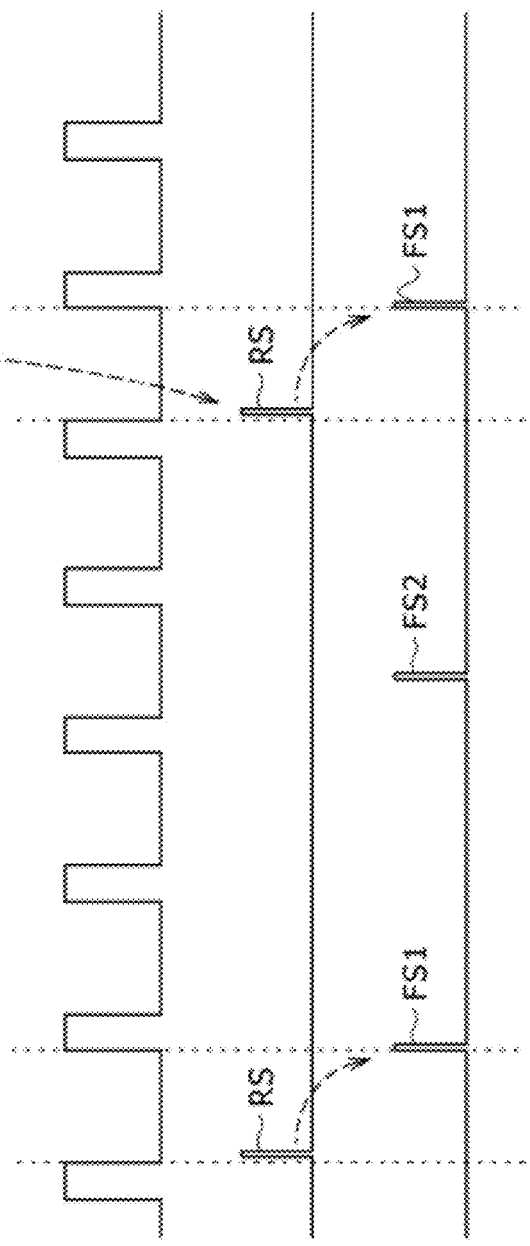
FIGS. 9A to 9D are views illustrating control for establishing synchronism of moving picture frames and wherein FIG. 9A schematically shows images reproduced by different reproduction PCs.

A particular example of the control for establishing synchronism with a moving picture frame is described with reference to FIGS. 9A to 9D. FIG. 9A illustrates frame images based on an output of the reproduction PC 15 in a simplified form. Meanwhile, FIG. 9B illustrates a pulse waveform of the vertical synchronizing signal (V-Sync signal) of a frame image outputted from the reproduction PC 15. It is to be noted that, in the present embodiment, since the reproduction PC 15 outputs an image signal including a plurality of parallax images in one frame, an actual image looks more complicated. Reference characters F1 to F5 indicate image frames of one set (five frames) outputted from the reproduction PC 15 in order to form two frames of stereoscopic moving pictures. As seen in FIG. 9A, information for identifying a frame is embedded in advance as control information in one pixel 400, for example, at the leftmost uppermost portion of the fifth frame image F5 from among the frame images F1 to F5 of one set outputted from the reproduction PC 15.

FIG. 9C illustrates a signal waveform of a synchronizing pulse (identification signal) RS included in an image reproduced by the reproduction PCs 15. Meanwhile, FIG. 9D illustrates a signal waveform of a cue search signal FS for cue search for a moving picture frame by the three-dimensional display apparatus 10. Each of the external control circuits 14 detects a synchronizing pulse RS included in an image reproduced by the corresponding reproduction PC 15 and produces, based on the detected synchronizing pulse RS, a cue search signal FS for carrying out cue search for a moving picture frame of multi-parallax stereoscopic moving picture display by the corresponding three-dimensional display apparatus 10. It is to be noted that, in FIG. 9D, a cue search signal FS1 is produced based on the synchronizing pulse RS, and another cue search signal FS2 produced with an internal clock of the external control circuit 14 itself.

The three-dimensional display apparatus 10 performs cue search for a moving picture frame based on the cue search signal FS generated by the external control circuit 14. Consequently, multi-parallax stereoscopic moving picture display can be carried out at the second frame rate different from the frame rate (first frame rate) in the reproduction PC 15. Since the synchronizing pulse RS is included in the fifth frame image F5 from among the frame images F1 to F5 of one set, it can be recognized that the next frame is the first frame of a set. A frame image reproduced based on the cue search signal FS1 by the three-dimensional display apparatus 10 is the first frame F1 from among the frame images F1 to F5 of one set. In an existing reproduction apparatus, only a V-Sync signal and an H-Sync signal (horizontal synchronizing signal) or like signals are used as signals for synchronous control and a cue search frame and other frames of stereoscopic moving pictures may not be identified from each other. However, in the present embodiment, a cue search frame and other frames can be identified readily from each other by such control as described above.

It is to be noted that control information may be included not in one pixel but in a plurality of pixels. Or, control information may be included in a line. For example, control information may be included in the first line of an image. Where control information is included in two or more pixels, also it becomes possible to include not only synchronous control information but also more complicated control information. In this instance, for example, a numerical value or values of a binary number may be placed in two or more pixels. In particular, it is a possible idea, for example, to carry out control of changing the gamma value to be used in the spatial light modulator 3 based on control information. Further, in the present embodiment, since a binary image is reproduced, the luminance is given only as binary values of black and white. Thus, a threshold value to be used for decision between white and black may be included in control information.

Now, a method of generating parallax images to be reproduced by such reproduction PCs 15 as described above is described. FIG. 4 schematically illustrates an example of an authoring system for generating parallax images. Parallax images can be generated by a 3DCG (3 Dimensional computer Graphics) technique. Multi-parallax images can be generated by carrying out a rendering process by a rendering technique of the 3DCG. In the 3DCG rendering technique, virtual cameras are set, and an image to be picked up by the virtual cameras is generated as parallax images.

In order to generate parallax images to be displayed by the three-dimensional image display system of FIG. 1, it is necessary to carry out a large number of rendering processes (rendering by 120 times for one scene of moving pictures of each three-dimensional display apparatus 10). The speed of rendering relies upon the complicatedness of the scene, and the processing speed is insufficient for the real time rendering process. Therefore, moving pictures to be reproduced are generated by an authoring tool in advance. FIG. 4 schematically shows the authoring tool.

The authoring tool is a batch processing program and generates all reproduction frames in accordance with an instruction of a setting file 220. The setting file 220 defines parameters of 3D scenes, the dimensions and arrangement of optical systems, the size of an output screen image, the storage site of a frame file and so forth.

The authoring system first produces 3D scenes. Here, a "3DS Loader" module 203 loads 3D objects from a 3DS file 201 of the 3DS format for universal use. Then, a "Scene Lab" module 202 is used to produce a 3D scene list 204 including movement, rotation and extension/contraction conversion parameters for each scene (block 200 of FIG. 4).

Then, the authoring tool adds information of the optical systems as setting information of the dimensions of the optical systems, the view angles of the projection lenses, the distances between the projectors and so forth. The projectors of the units are handled as cameras (virtual cameras) 300, and the projector array is handled as a camera array. It is to be noted that the units here correspond to the three-dimensional display apparatus 10-1 to 10-6 of FIG. 1.

Then, all cameras 300 render each 3D scene with a wire frame in the order of the cameras 300 (arrow marks directed from the cameras 300 to the scene lists 204 in FIG. 4). A result of the rendering is parallax images of 24 bits, and in order to dispose the parallax images on bit planes, the rendered images are binarized and then disposed on two bit planes corresponding to the two outputs (full color frame buffers for two outputs of the digital visual interfaces) in the order (block 210 of FIG. 4). After disposing 48 parallaxes, the full color flame buffers are stored as one frame file. When next 48 parallaxes are to be rendered, the buffer is cleared and a similar process is carried out.

The process described above is repeated to produce moving pictures for all optical units (three-dimensional display apparatus 10-1 to 10-6) concentratedly and dispose the produced moving pictures to the reproduction PCs 15 of the distributed system (stores the moving pictures into the image data storage sections 11 of the reproduction PCs 15). By applying a same number list to the moving picture frames disposed in the reproduction PCs 15, frame synchronism can be established after the number of each frame is verified upon moving picture production.

As described above, with the three-dimensional image display system according to the present embodiment, the reproduction PCs 15 temporally divide a plurality of parallax images within one frame and successively reproduce the divided parallax images. Then, each of the three-dimensional display apparatus 10 projects a predetermined number of parallax images to different positions in the space in synchronism with the reproduction timings of the reproduced parallax images to carry out multi-parallax stereoscopic display including the plurality of parallax images. With the three-dimensional image display system, since an image signal including information of a plurality of parallax images in one frame is outputted and a plurality of parallax images are successively reproduced time divisionally within one frame based on the outputted image signal, a large number of parallax images can be reproduced at a high speed. Since multi-parallax stereoscopic display is carried out based on the large amount of parallax images reproduced at a high speed, stereoscopic images of moving pictures can be reproduced using the light beam reproduction method.

Further, with the three-dimensional image display system, parallax images which form stereoscopic moving pictures are dispersed and disposed to a plurality of reproduction PCs 15 such that the reproduction PCs 15 locally manage the parallax images, the burden of communications between the reproduction PCs 15 upon reproduction is moderated. Therefore, there is no limitation to the number of reproduction PCs 15, and consequently, the expandability is high.

It is to be noted that, while, in the foregoing description, parallax images for stereoscopic moving pictures are generated in advance by batch processing by means of an authoring tool, if the number of such reproduction PCs 15 is increased to further divide the rendering process, then also rendering on the real time basis is possible. Further, if rendering on the real time basis can be achieved, then also it is possible to achieve interactive stereoscopic moving picture display. Further, while, in the foregoing description, parallax images for stereoscopic moving pictures are generated as CG moving pictures by processing of a 3D object, if not virtual cameras but actual cameras are disposed to generate parallax images, then not CG stereoscopic moving pictures but stereoscopic moving pictures of the real world can be generated.

Further, with the three-dimensional image display system according to the present embodiment, since a signal for identifying a frame is included as control information in parallax images themselves such that control is carried out in accordance with the identification signal included in the parallax images to carry out multi-parallax stereoscopic moving picture display, synchronous control where multi-parallax stereoscopic moving picture display is carried out can be carried out readily. Where the number of parallaxes of stereoscopic images is increased, then also the number of data to be processed increases, and it is necessary to additionally provide the reproduction units (reproduction PCs 15 and three-dimensional display apparatus 10). As communication between the reproduction PCs 15 increases, this influences on the accuracy in synchronization between the reproduction PCs 15. With the three-dimensional image display system according to the present embodiment, since stereoscopic moving pictures to be reproduced by the three-dimensional display apparatus 10 in the reproduction units are appropriately controlled in synchronism, even if the accuracy in synchronism between the reproduction PCs 15 deteriorates, stereoscopic moving pictures can be displayed appropriately without failure.

Modification to the First Embodiment

Now, a modification to the stereoscopic display apparatus according to the present embodiment is described.

Figure 22:
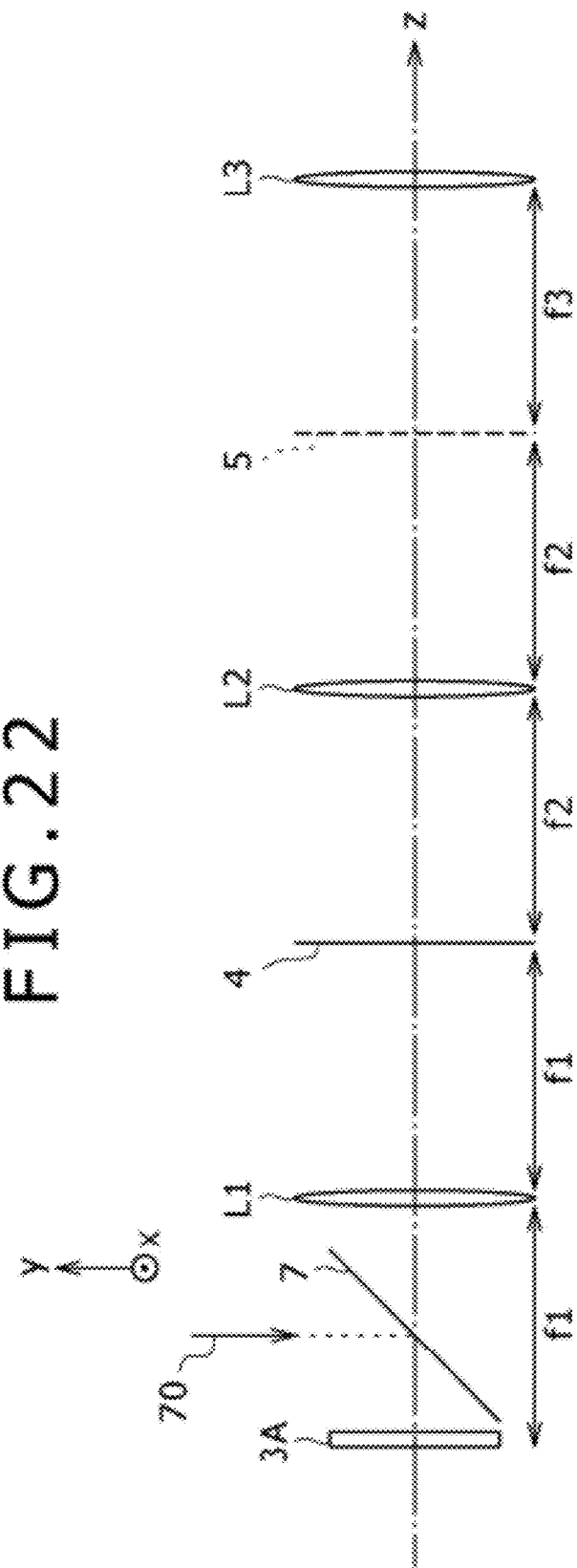
FIG. 22 is a schematic view showing an example of a configuration of a three-dimensional display apparatus which uses a spatial light modulator of the reflection type.

FIG. 22 shows the modification. While FIGS. 2A and 2B show the example of the configuration of the optical system wherein a spatial light modulator of the transmission type is used as the spatial light modulator 3, a spatial light modulator of the reflection type may be used instead. The spatial light modulator 3A of the reflection type may be, for example, a liquid crystal display apparatus of the reflection type or a display apparatus which uses a DMD (Digital Micromirror Device).

The three-dimensional image display system according to the first modification includes a beam splitter 7 on the optical axis. The beam splitter 7 has a function of passing or reflecting light depending upon the difference of a polarized light component. The beam splitter 7 reflects illumination light 70 toward the spatial light modulator 3A of the reflection type. Meanwhile, the beam splitter 7 passes reflected light from the spatial light modulator 3A therethrough. It is to be noted that the light source 1 and the illumination optical system 2 may have the same configuration as those shown in FIGS. 2A and 2B. Also the configuration of the remaining elements may be same as that shown in FIGS. 2A and 2B, and also the conditions of the optical system are similar.

Second Embodiment

Now, a three-dimensional image display system according to a second embodiment of the present invention is described. While, in the first embodiment described above, the three-dimensional image display system has a configuration wherein a two-dimensional spatial light modulator is used for the spatial light modulator 3, the present embodiment is a three-dimensional image display system which uses a one-dimensional spatial light modulator which generates a one-dimensional image in place of the spatial light modulator 3.

Figure 23:
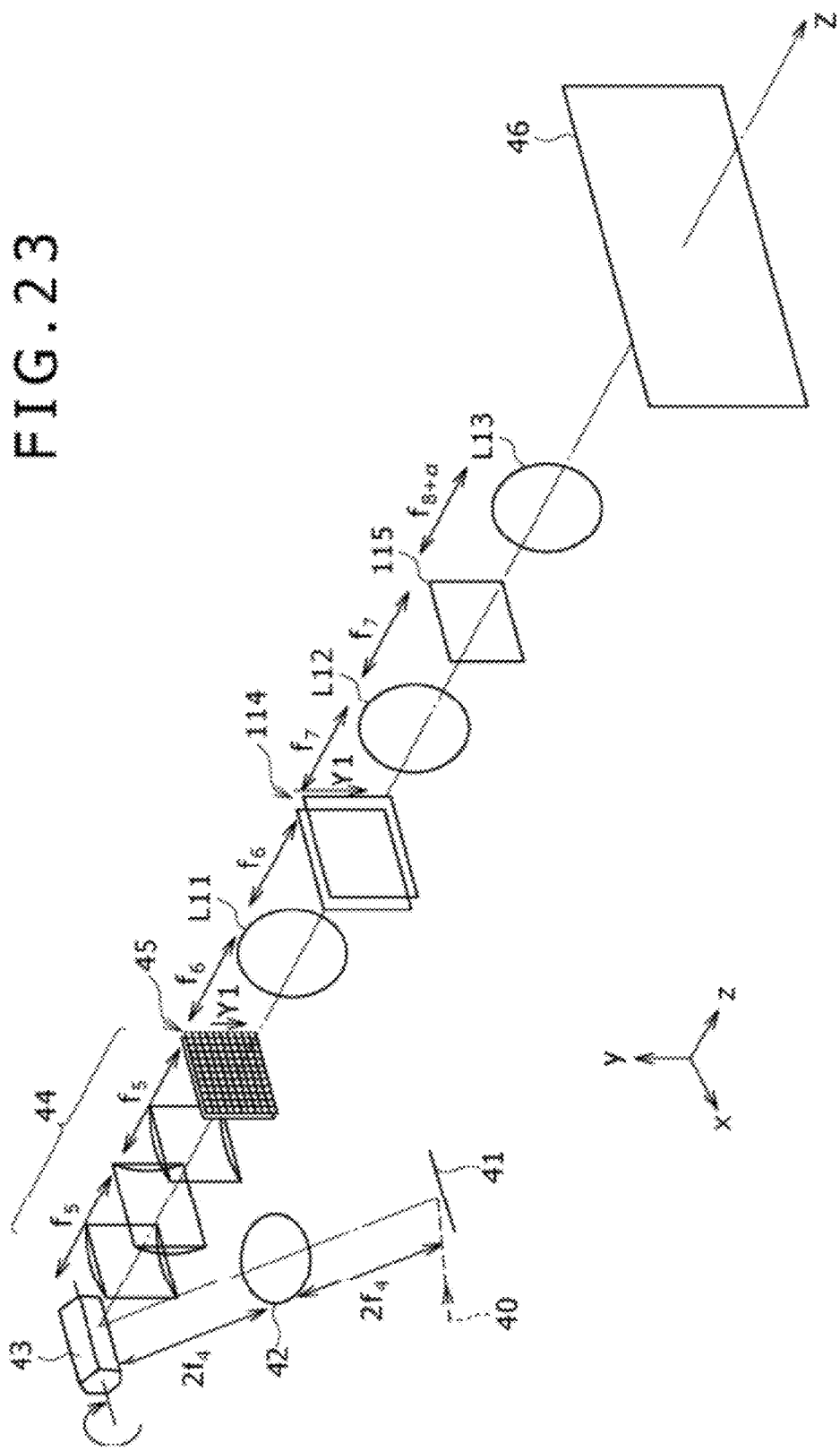
FIG. 23 is a schematic view showing an example of a configuration of a three-dimensional display apparatus which uses a one-dimensional spatial light modulator.

FIG. 23 shows an example of a configuration of the three-dimensional display apparatus. Referring to FIG. 23, the three-dimensional display apparatus shown includes a grating light valve (GLV) device 41 serving as a one-dimensional spatial light modulator, a scanning object system for developing the one-dimensional image generated by the GLV device 41 in a two-dimensional space to generate a two-dimensional image, a grating filter 45 disposed on a generation plane of the two-dimensional image for producing high-order diffraction lights for each pixel of the two-dimensional image, and a anisotropic diffusion filter 46 for diffusing the diffraction lights generated in the one-dimensional direction in a two-dimensional direction. The scanning optical system includes a first lens system 42 for scanning, a deflector 43 formed from a galvano mirror or a polygon mirror, and a second lens system 44 for scanning, disposed in order from the GLV device 41 side. The generation direction of the one-dimensional image by the GLV device 41 is a horizontal direction, and the scanning direction by the scanning optical system is a vertical direction Y1 as illustrated in FIG. 23 on the grating filter 45. However, the generation direction of the one-dimensional direction by the GLV device 41 may be set to the vertical direction while the scanning direction by the scanning optical system is set to the horizontal direction.

The three-dimensional display apparatus further includes a first lens L1 for forming Fourier transform images of spatial frequencies in the two-dimensional image formed on the grating filter 45, a spatial filter 114 for spatially and spectrally filtering the Fourier transform images, a second lens L12 for forming real images (inverse Fourier transform images) 115 of the two-dimensional image formed on the grating filter 45, and a third lens L13 for forming conjugate images of the Fourier transform images filtered by the spatial filter 114. The first lens L11, spatial filter 114, second lens L12 and third lens L13 are similar in configuration and action to the first lens L1, spatial filter 4, second lens L2 and third lens L3 shown in FIGS. 2A and 2B, respectively. It is to be noted that reference characters f4 to f8 in FIG. 23 denote focal distances of lens components at the portions.

The GLV device 41 is formed from a plurality of ribbon-like mirrors (hereinafter referred to merely as ribbons) disposed on the same line. The ribbons are converted into diffraction gratings by positional displacement thereof when a voltage is applied. Thus, the GLV device 41 carries out amplitude modulation for diffraction light obtained therefrom thereby to obtain an arbitrary one-dimensional light signal. The GLV device 41 emits ±first order diffraction lights as signal light. The GLV device 41 functions as a one-dimensional light diffraction device.

When the three-dimensional display apparatus of the present embodiment is carried out, the difference where a one-dimensional spatial light modulator is used as the spatial light modulator from where a two-dimensional spatial light modulator is used resides first in that, since images which can be taken out at the same time are one-dimensional images, an optical system for spatially developing a one-dimensional image into a two-dimensional image in order to produce a two-dimensional image is demanded. The scanning optical system formed from the first lens system 42, deflector 43 and second lens system 44 plays this role. The second difference resides in that, where a one-dimensional spatial light modulator is used, since images which can be acquired at the same time are one-dimensional images, also diffraction occurs in the one-dimensional space. For this, an optical system for diffusing the diffraction lights in the vertical direction relative to the acquired one-dimensional space is demanded. The anisotropic diffusion filter 46 plays this role. The third difference resides in that, since the GLV device 41 uses ±first order diffraction lights as signal light, in order to use higher order diffraction lights, it is necessary to dispose a filter of the amplitude type or the phase type on a two-dimensionally developed plane for images generated from the signal light to newly generate diffraction lights. The grating filter 45 plays this role. The fourth difference resides in that, since the light signals outputted from the GLV device 41 simultaneously are one-dimensional signals, the manner of arrangement of apertures on the spatial filter may be any of one-dimensional and two-dimensional arrangements.

In this three-dimensional display apparatus, one-dimensional images formed from ±first order diffraction lights generated by the GLV device 41 are developed two-dimensionally by the scanning optical system, and the developed two-dimensional images are obtained on the grating filter 45. The grating filter 45 generates higher order diffraction lights for each of the pixels of the two-dimensional images. Later filtering operation of the external control circuit 14 is similar to that in the first embodiment described hereinabove.

It is to be noted that the general configuration of the three-dimensional image display system is same as that of the first embodiment described hereinabove with reference to FIG. 1.

Third Embodiment

Now, a three-dimensional image display system according to a third embodiment of the present invention is described. While, in the first embodiment described hereinabove, the parallax images are binary images, the present invention can be applied also where the parallax images have gradations (gray scale) of two bits or more. In this instance, the image signal generation section 12 of each reproduction PC 15 should be configured such that it divides one frame into a plurality of bit plane groups and outputs an image signal wherein each of the bit plane groups is formed from two or more bit planes. Then, information of at least one parallax image should be applied to each bit plane group such that gradation representation is carried out within each bit plane group. The display periods of the bit plane groups are set equal to each other. It is to be noted that it can be considered that, in the first embodiment described hereinabove, one bit plane is allocated to one bit plane group and information of one parallax image is allocated to one bit plane.

Figure 24:
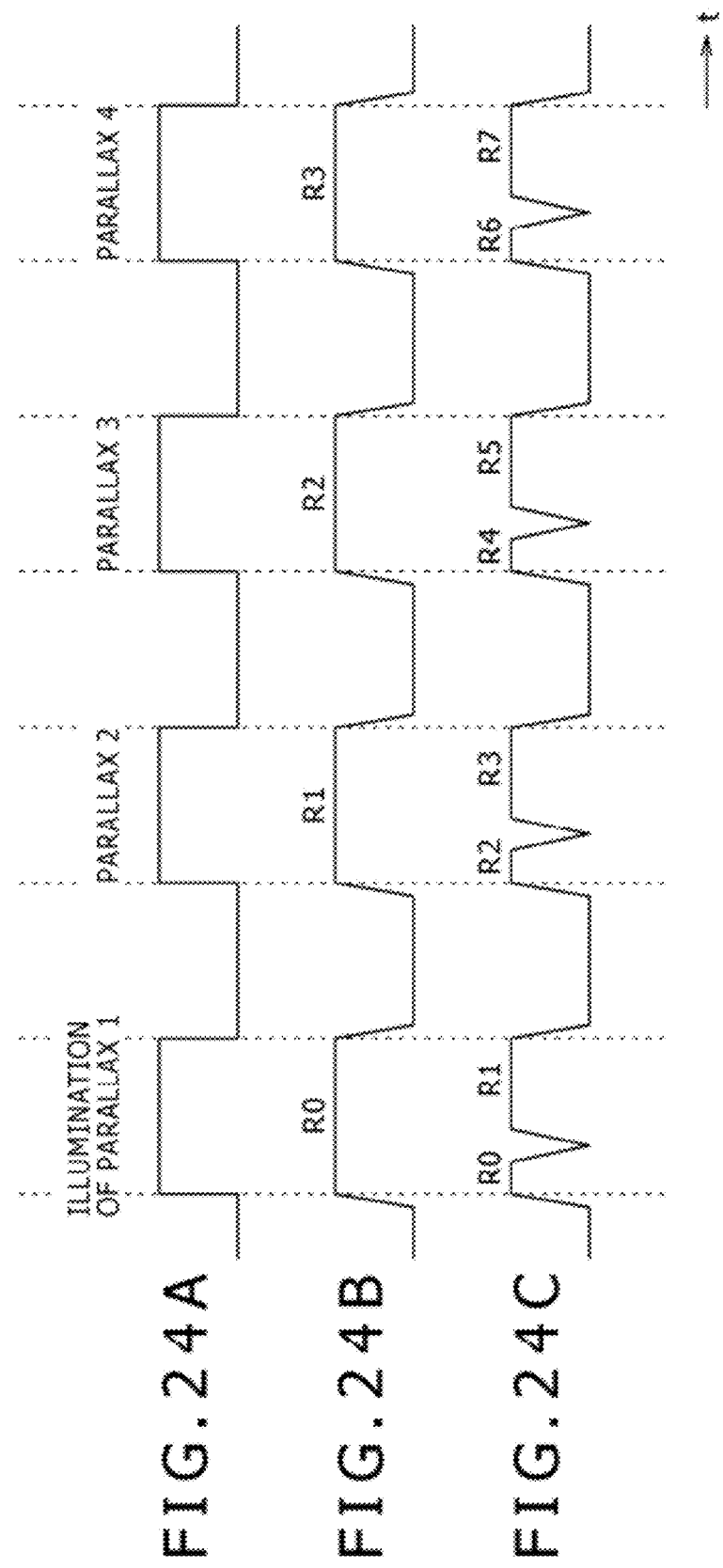

FIG. 24C illustrates arrangement of bit planes where a gray scale of four gradations is implemented with two bits for each parallax image. In this instance, one frame is formed from four bit plane groups, and each bit plane group has two bit planes having display periods different from each other. For example, one bit plane group is formed from two bit planes R0 and R1 having different display periods from each other. It is to be noted that FIG. 24A illustrates a pulse waveform within a period within which illumination light is irradiated, and FIG. 24B illustrates an example of arrangement of bit planes where one parallax image is displayed in a gradation of one bit (two gradations). It is to be noted that, while, in FIGS. 24B and 24C, a signal outputted from the first signal outputting section (digital visual interface DVI1) of the image signal generation section 12 is illustrated, also the second signal outputting section (digital visual interface DVI2) outputs a similar signal. Further, although FIGS. 24A, 24B and 24C illustrate only signals of the R channel, also signals of the G and B channels are similar to those of the R channel. Where such arrangement as illustrated in FIG. 24C is applied, information of four parallax images represented in a gray scale of four gradations is included in and outputted together with one frame. If bit planes are allocated to color images of 24 bits for R, G and B, then information of 4×3=12 parallax images is included in and outputted together with one frame for one digital visual interface. The entire image signal generation section 12 (two digital visual interfaces) outputs information of 24 parallax images included in one frame.

Where such parallax images with a gradation as described above are used, stereoscopic moving pictures which provide a higher sense of reality can be reproduced.

Fourth Embodiment

While, in the embodiments described above, parallax images have a single color, the present invention can be applied also where parallax images are displayed in a plurality of colors (color display).

In particular, while, in the embodiments described above, all of bit planes of the R, G and B channels are allocated to different parallax images, bit planes of the R, G and B channels may be used as bit planes of color images similarly to ordinary color images.

Figure 25:
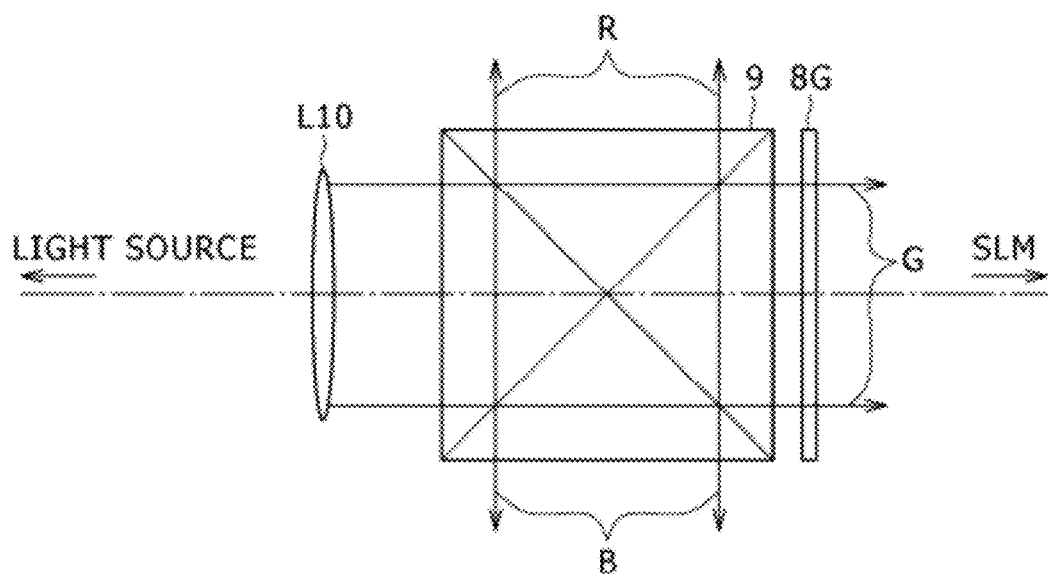
FIG. 25 is a schematic view showing an example of a configuration of an illumination optical system for color display.

It is to be noted that, where color display is carried out, it is necessary for each three-dimensional display apparatus 10 to generate a plurality of illumination lights of different colors. FIG. 25 shows a first example of a configuration of an illumination optical system for color display. Here, the wavelength band of the light source 1 extends over a wide band. The configuration example of FIG. 25 relates to a configuration of an optical system where a plurality of lights of narrow bands are extracted from a light of a wide band. This makes it possible to generate illumination lights for carrying out color image display. Referring to FIG. 25, in the present configuration example, a dichroic prism 9 and a single narrow band filter 8G are disposed on the emergence side of a final lens L10 of the illumination optical system 2 in each three-dimensional display apparatus 10. The dichroic prism 9 reflects, for example, a red light R and a blue light B toward different directions from each other and passes a light beam including a green light G therethrough. On the emergence side of the light beam including the green light G from the dichroic prism 9, the narrow band filter 8G for selecting and separating the green light G is disposed.

Figure 26:
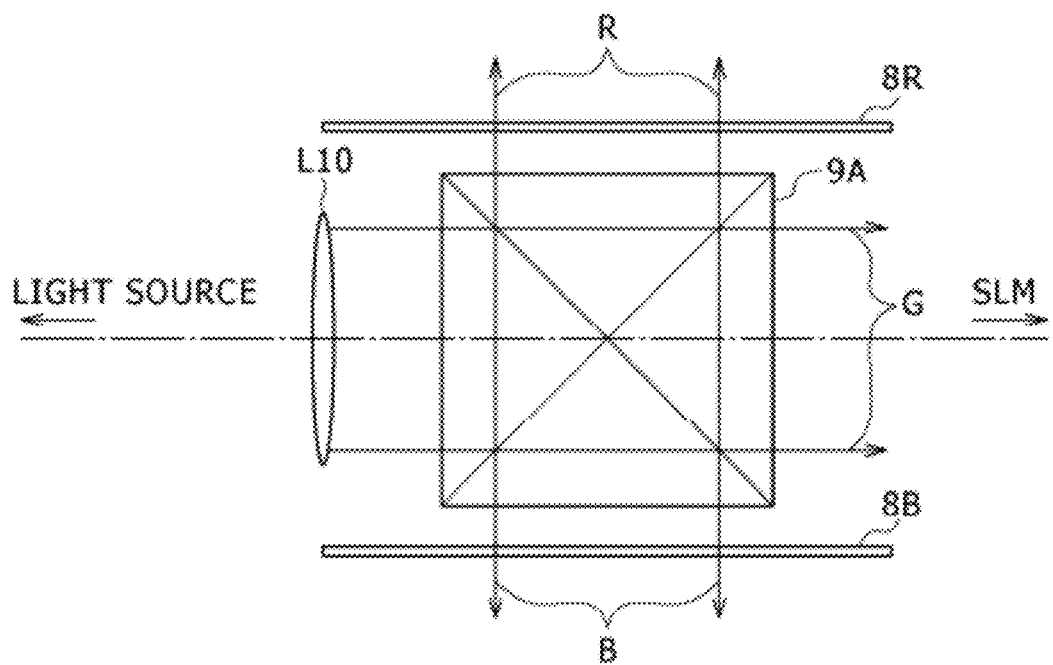
FIG. 26 is a similar view but showing another example of a configuration of the illumination optical system for color display.

FIG. 26 shows a second example of a configuration of the illumination optical system for color display. Also this configuration example relates to a configuration of an optical system where a plurality of lights of narrow bands are extracted from a light of a wide band similarly to the configuration example of FIG. 25. In the present configuration example, however, a dichroic prism 9A and two narrow band filters 8R and 8B are provided on the emergence side of the final lens L10 of the illumination optical system 2 in each three-dimensional display apparatus 10. The dichroic prism 9A reflects, for example, a light beam including red light R and blue light B toward different directions from each other and passes green light G therethrough. A narrow band filter 8R for selecting and separating the red light R is disposed on the emergence side of the light beam including the red right R from the dichroic prism 9A. Further, a narrow band filter 8B for selecting and separating the blue light B is disposed on the emergence side of the light beam including the blue light B from the dichroic prism 9A.

It is to be noted that, where the illumination optical system of FIG. 25 or 26 is used to carry out color image display, the illumination optical system further includes a bending optical system and a synthesis optical system such that the color lights are illuminated on a plurality of spatial light modulators 3 for a plurality of different illumination lights of different wavelength bands which are components of a color image. Further, the spatial light modulators 3 and the spatial filters 4 are spatially and temporally controlled for the individual color lights.

It is to be noted that the method of generating illumination lights where color image display is carried out is not limited to those described above with reference to FIGS. 25 and 26. For example, a different configuration (configuration wherein the positions at which narrow band filters are to be disposed are changed) may be used depending upon the wavelength selection characteristics of the dichroic prisms and the narrow-band filters.

Fifth Embodiment

Now, a fifth embodiment of the present invention is described. While, in the first embodiment described hereinabove, images reproduced by each reproduction PC 15 include control information (frame identification signal) and the external control circuit 14 provided in each three-dimensional display apparatus 10 carries out synchronous control for stereoscopic moving picture reproduction based on the control information, this control may be carried out otherwise by the control circuit 214 on the monitoring PC 200 side.

Figure 27:
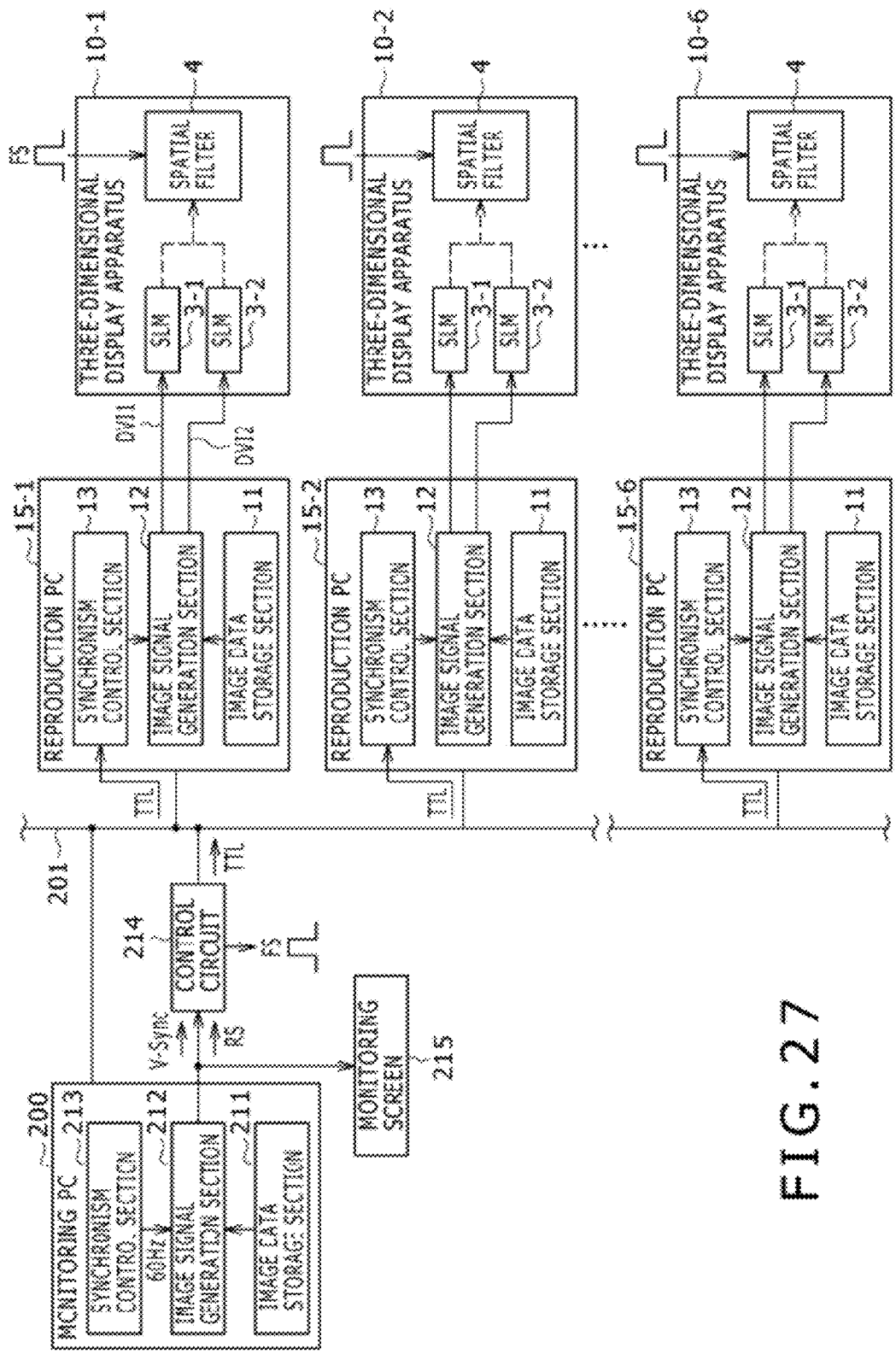
FIG. 27 is a block diagram showing a general configuration of a three-dimensional display system according to a fifth embodiment of the present invention.

FIG. 27 shows an example of a configuration of a three-dimensional image display system according to the present fifth embodiment. In the present embodiment, not the external control circuit 14 shown in FIG. 1 but the control circuit 214 on the monitoring PC 200 side has a function of carrying out synchronous control for stereoscopic moving picture reproduction. The configuration of the other part of the three-dimensional image display system is basically similar to that of the first embodiment described hereinabove.

A particular example of control for establishing synchronism of moving picture frames in the present embodiment is described with reference to FIGS. 28A to 28E. FIG. 28A illustrates an example of frame images for control outputted for synchronous control from the monitoring PC 200. The fame images correspond to the frame images F1 to F5 based on an output from the reproduction PC 15 shown in FIG. 9A. However, the monitoring PC 200 need not reproduce actual parallax images, but arbitrary images may be applied only if they are in synchronism with the frame rate (first frame rate) in the reproduction PC 15. In the example of FIG. 28A, an image which includes a single white horizontal line on the black background is reproduced at a rate of once per five frames. The single white horizontal line is used as control information (frame identification information) similarly to the pixel 400 of one pixel shown in FIG. 9A. Similarly as in the case of FIG. 9A, identification information (single white horizontal line) is embedded in the fifth frame image F5 from among frame images F1 to F5 of one set. The other four frames F1 to F4 have, for example, the entirely block background.

FIG. 28B illustrates a pulse waveform of a vertical synchronizing signal (V-Sync signal) of a frame image outputted from the monitoring PC 200. FIG. 28C illustrates a signal waveform for detecting the synchronizing pulse RS by means of the control circuit 214. Meanwhile, FIG. 28E illustrates a signal waveform of the cue search signal FS for performing cue search for a moving picture frame in the three-dimensional display apparatus 10. The control circuit 214 detects the synchronizing pulse RS included in an image reproduced by the monitoring PC 200 and generates a cue search signal FS for performing cue search for a moving picture frame of multi-parallax stereoscopic moving picture display by each three-dimensional display apparatus 10 based on the synchronizing pulse RS. It is to be noted that, in FIG. 28E, a cue search signal FS1 is generated based on the synchronizing pulse RS, but the other cue search signal FS2 is generated based on an internal clock of the control circuit 214 itself.

The three-dimensional display apparatus 10 performs cue search for a moving picture frame based on the cue search signal FS generated by the control circuit 214. Consequently, multi-parallax stereoscopic moving picture display can be carried out at the second frame rate different from the frame rate (first frame rate) in the reproduction PCs 15. The principle of the synchronous control is basically similar to that in the first embodiment described hereinabove.

Other Embodiments

The present invention is not limited to the embodiments described hereinabove but can be carried out in various modified forms. For example, the image signal generation section 12 of each reproduction PC 15 may output a signal to which information of two or more parallax images is allocates spatially to one bit plane. Then, the spatial light modulator 3 may temporally and spatially divide and successively reproduce a plurality of parallax images.

Further, while, in the embodiments described hereinabove, control information is applied once for every five frames, the rate at which control information is to be added is not limited to this rate, but can be changed suitably depending upon the contents of control, the frame rate of stereoscopic moving pictures and so forth. In other words, control information may be added for every one or every arbitrary number of frames.

While preferred embodiments of the present invention have been described using specific terms, such description is for illustrative purpose only, and it is to be understood that changes and variations may be made without departing from the spirit or scope of the following claims.

What is claimed is:

1. A three-dimensional image display system, comprising:
a multi-parallax image reproduction apparatus configured to reproduce two-dimensional images, which include a plurality of parallax images within one frame, at a first frame rate;
a three-dimensional display apparatus configured to carry out multi-parallax stereoscopic moving picture display at a second frame rate based on a plurality of parallax images reproduced by said multi-parallax image reproduction apparatus where one frame of stereoscopic moving pictures is formed from a multi-parallax image formed from a predetermined number of parallax images, said multi-parallax image reproduction apparatus reproducing an image wherein control information is included in any of the parallax images for every one frame or every plurality of frames, and said three-dimensional image display apparatus carrying out control in accordance with the control information included in the parallax images to carry out the multi-parallax stereoscopic moving picture display; and
an external control circuit configured to detect the control information from the images reproduced by said multi-parallax image reproduction apparatus and control said three-dimensional display apparatus based on the control information,
wherein,
said multi-parallax image reproduction apparatus reproduces, for every predetermined number of frames, an image which includes an identification signal for identifying a frame as the control information;
said external control circuit generates, based on the identification signal, a cue search signal for allowing said three-dimensional display apparatus to carry out cue search for a moving picture frame of the multi-parallax stereoscopic moving picture display; and
said three-dimensional display apparatus carries out cue search for a moving picture frame based on the cue search signal to carry out the multi-parallax stereoscopic moving picture display at the second frame rate different from the first frame rate.

2. A three-dimensional image display system, comprising:
a multi-parallax image reproduction apparatus configured to reproduce two-dimensional images, which include a plurality of parallax images within one frame, at a first frame rate;
a three-dimensional display apparatus configured to carry out multi-parallax stereoscopic moving picture display at a second frame rate based on a plurality of parallax images reproduced by said multi-parallax image reproduction apparatus where one frame of stereoscopic moving pictures is formed from a multi-parallax image formed from a predetermined number of parallax images, said multi-parallax image reproduction apparatus reproducing an image wherein control information is included in any of the parallax images for every one frame or every plurality of frames, and said three-dimensional image display apparatus carrying out control in accordance with the control information included in the parallax images to carry out the multi-parallax stereoscopic moving picture display; and
an external control circuit configured to detect the control information from the images reproduced by said multi-parallax image reproduction apparatus and control said three-dimensional display apparatus based on the control information,
wherein,
said three-dimensional display apparatus includes a plurality of projectors or projection means equivalent to a plurality of projectors configured to project a predetermined number of parallax images to individually different positions in the space; and said external control circuit carries out control of a projection timing by said plurality of projectors or said projection means based on the control information.

3. A three-dimensional image display system, comprising:

a multi-parallax image reproduction apparatus configured to reproduce two-dimensional images, which include a plurality of parallax images within one frame, at a first frame rate;

a three-dimensional display apparatus configured to carry out multi-parallax stereoscopic moving picture display at a second frame rate based on a plurality of parallax images reproduced by said multi-parallax image reproduction apparatus where one frame of stereoscopic moving pictures is formed from a multi-parallax image formed from a predetermined number of parallax images, said multi-parallax image reproduction apparatus reproducing an image wherein control information is included in any of the parallax images for every one frame or every plurality of frames, and said three-dimensional image display apparatus carrying out control in accordance with the control information included in the parallax images to carry out the multi-parallax stereoscopic moving picture display;

an external control circuit configured to detect the control information from the images reproduced by said multi-parallax image reproduction apparatus and control said three-dimensional display apparatus based on the control information;

a signal generation section configured to output an image signal wherein information of a plurality of parallax images is included in one frame which is divided into a plurality of bit plane groups each of which includes one, two or more bit planes, by allocating information of at least one parallax image to each of the bit plane groups; and an image formation section configured to temporally divide a plurality of parallax images within one frame based on the image signal outputted from said signal generation section and successively reproduce the temporally divided parallax images, wherein, said three-dimensional display apparatus projecting a predetermined number of parallax images to different positions in the space in synchronism with a reproduction timing of each parallax image reproduced by said image formation section to carry out multi-parallax stereoscopic display of the predetermined number of parallax images.

* * * * *

UNITED STATES PATENT AND TRADEMARK OFFICE
CERTIFICATE OF CORRECTION

| | |
|---|---|
| PATENT NO. | : 8,174,565 B2 |
| APPLICATION NO. | : 12/025960 |
| DATED | : May 8, 2012 |
| INVENTOR(S) | : Yoshio Suzuki et al. |

It is certified that error appears in the above-identified patent and that said Letters Patent is hereby corrected as shown below:

On the cover page of the patent:

(75) "Kyohei Iswamoto"

should be

(75) --Kyohei Iwamoto--

Signed and Sealed this
Twenty-fourth Day of July, 2012

David J. Kappos
*Director of the United States Patent and Trademark Office*